(12) United States Patent
Seshadri et al.

(10) Patent No.: US 7,698,276 B2
(45) Date of Patent: *Apr. 13, 2010

(54) FRAMEWORK FOR PROVIDING A SUBSCRIPTION BASED NOTIFICATION SYSTEM

(75) Inventors: Praveen Seshadri, Bellevue, WA (US); Shyamalan Pather, Seattle, WA (US); Philip Garrett, Woodinville, WA (US); Robert F. Blanch, Clyde Hill, WA (US); Holly Knight, Woodinville, WA (US); Charles Tete Mensa-Annan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

This patent is subject to a terminal disclaimer.

(21) Appl. No.: 10/376,197

(22) Filed: Feb. 26, 2003

(65) Prior Publication Data

US 2004/0068481 A1 Apr. 8, 2004

Related U.S. Application Data

(63) Continuation-in-part of application No. 10/180,360, filed on Jul. 26, 2002, now abandoned.

(51) Int. Cl.
*G06F 17/30* (2006.01)
(52) U.S. Cl. .................. 707/10; 707/1; 707/4; 719/318
(58) Field of Classification Search .................... 707/10, 707/4, 1; 719/318
See application file for complete search history.

(56) References Cited

U.S. PATENT DOCUMENTS 4,774,658 A    9/1988    Lewin
5,301,326 A    4/1994    Linnett
5,367,633 A    11/1994   Matheny et al.
5,416,725 A    5/1995    Pacheco et al.
5,481,700 A    1/1996    Thuraisingham
5,555,346 A    9/1996    Gross et al.
5,760,768 A    6/1998    Gram
5,813,007 A *  9/1998    Nielsen ........................ 707/10
5,835,768 A    11/1998   Miller
5,852,812 A * 12/1998    Reeder ........................ 705/39
5,870,746 A    2/1999    Knutson
5,893,091 A *  4/1999    Hunt et al. ..................... 707/3

(Continued)

OTHER PUBLICATIONS

IEEE, "The Authoritative Dictionary of IEEE Standards Terms", 2000, 7th Edition, p. 701.*

(Continued)

*Primary Examiner*—Don Wong
*Assistant Examiner*—Michael Le
(74) *Attorney, Agent, or Firm*—Workman Nydegger

(57) ABSTRACT

The present invention relates to a system and methodology to facilitate automated delivery of notifications according to various applications that can be employed with the framework of a notification platform. The applications are described by models that enable users to easily/conveniently interact with the notification platform. The application models can be incorporated within and/or associated with the notification platform. Moreover, the models can be employed to enhance subscription experiences for users, whereby users can easily and economically subscribe and unsubscribe to one or more notification services. In addition, subscriptions can be dynamically adjusted based upon explicit commands from the user, inferred from contextual user states, and/or based upon incentives or other factors directed to the user.

30 Claims, 18 Drawing Sheets

U.S. PATENT DOCUMENTS

| | | | |
|---|---|---|---|
| 5,973,612 | A | 10/1999 | Deo et al. |
| 5,974,406 | A | 10/1999 | Bisdikian et al. |
| 5,999,978 | A | 12/1999 | Angal et al. |
| 6,016,394 | A | 1/2000 | Walker |
| 6,021,403 | A * | 2/2000 | Horvitz et al. ............... 706/45 |
| 6,026,235 | A | 2/2000 | Shaughnessy |
| 6,055,505 | A | 4/2000 | Elston |
| 6,055,570 | A * | 4/2000 | Nielsen ................... 709/224 |
| 6,108,712 | A | 8/2000 | Hayes |
| 6,112,192 | A | 8/2000 | Capek |
| 6,122,633 | A | 9/2000 | Leyman et al. |
| 6,138,158 | A * | 10/2000 | Boyle et al. ............... 709/225 |
| 6,151,643 | A | 11/2000 | Cheng et al. |
| 6,167,448 | A | 12/2000 | Hemphill et al. |
| 6,173,284 | B1 | 1/2001 | Brown |
| 6,185,613 | B1 | 2/2001 | Lawson et al. |
| 6,208,996 | B1 | 3/2001 | Ben-Shachar et al. |
| 6,209,011 | B1 | 3/2001 | Vong et al. |
| 6,219,782 | B1 | 4/2001 | Khan et al. |
| 6,256,664 | B1 | 7/2001 | Donoho et al. |
| 6,260,148 | B1 | 7/2001 | Aggarwal et al. |
| 6,275,957 | B1 | 8/2001 | Novik et al. |
| 6,292,825 | B1 | 9/2001 | Chang et al. |
| 6,314,533 | B1 | 11/2001 | Novik et al. |
| 6,327,705 | B1 | 12/2001 | Larsson |
| 6,330,566 | B1 | 12/2001 | Durham |
| 6,343,376 | B1 | 1/2002 | Saxe |
| 6,353,926 | B1 | 3/2002 | Parthesarathy et al. |
| 6,400,810 | B1 | 6/2002 | Skladman et al. |
| 6,405,191 | B1 | 6/2002 | Bhatt et al. |
| 6,424,966 | B1 | 7/2002 | Meyerzon et al. |
| 6,438,618 | B1 | 8/2002 | Lortz et al. |
| 6,446,092 | B1 | 9/2002 | Sutter |
| 6,466,949 | B2 | 10/2002 | Yang et al. |
| 6,480,885 | B1 | 11/2002 | Olivier |
| 6,484,149 | B1 | 11/2002 | Jammes |
| 6,487,548 | B1 | 11/2002 | Leymann et al. |
| 6,490,633 | B1 | 12/2002 | Linnett |
| 6,490,718 | B1 | 12/2002 | Watters |
| 6,510,429 | B1 * | 1/2003 | Todd ...................... 705/36 R |
| 6,513,026 | B1 | 1/2003 | Horvitz et al. |
| 6,532,471 | B1 | 3/2003 | Ku |
| 6,564,251 | B2 | 5/2003 | Katariya |
| 6,574,552 | B2 | 6/2003 | Yano et al. |
| 6,601,012 | B1 | 7/2003 | Horvitz et al. |
| 6,606,618 | B2 | 8/2003 | Delo |
| 6,629,138 | B1 | 9/2003 | Lambert et al. |
| 6,643,682 | B1 | 11/2003 | Todd et al. |
| 6,662,195 | B1 | 12/2003 | Langseth et al. |
| 6,704,803 | B2 | 3/2004 | Wilson et al. |
| 6,745,180 | B2 | 6/2004 | Yamanoue |
| 6,745,193 | B1 | 6/2004 | Horvitz |
| 6,748,318 | B1 | 6/2004 | Jones |
| 6,751,657 | B1 * | 6/2004 | Zothner ................... 709/220 |
| 6,766,329 | B1 | 7/2004 | Nicholson |
| 6,807,482 | B2 | 10/2004 | Utsumi |
| 6,826,560 | B1 | 11/2004 | Leymann et al. |
| 6,829,478 | B1 | 12/2004 | Layton et al. |
| 6,829,639 | B1 | 12/2004 | Lawson et al. |
| 6,829,770 | B1 | 12/2004 | Hinson et al. |
| 6,839,730 | B1 | 1/2005 | Ramabhadran |
| 6,847,889 | B2 | 1/2005 | Park et al. |
| 6,904,383 | B2 | 6/2005 | Tanaka et al. |
| 6,910,033 | B2 * | 6/2005 | Rosenblum ................ 707/3 |
| 6,910,070 | B1 | 6/2005 | Mishra et al. |
| 6,920,616 | B1 | 7/2005 | Abbott |
| 6,938,240 | B2 | 8/2005 | Charisius et al. |
| 6,981,250 | B1 | 12/2005 | Wiltamuth et al. |
| 6,988,262 | B1 | 1/2006 | Mallory et al. |
| 7,032,115 | B2 | 4/2006 | Kashani |
| 7,089,530 | B1 | 8/2006 | Dardinski et al. |
| 7,137,099 | B2 | 11/2006 | Knight |
| 7,266,595 | B1 | 9/2007 | Black |
| 7,275,235 | B2 | 9/2007 | Molinari et al. |
| 2001/0009016 | A1 | 7/2001 | Hoffmann et al. |
| 2002/0010804 | A1 | 1/2002 | Sanghvi et al. |
| 2002/0032597 | A1 | 3/2002 | Chanos |
| 2002/0032602 | A1 | 3/2002 | Lanzillo et al. |
| 2002/0032771 | A1 | 3/2002 | Gledje |
| 2002/0035482 | A1 | 3/2002 | Coble et al. |
| 2002/0069244 | A1 * | 6/2002 | Blair et al. ................ 709/203 |
| 2002/0075293 | A1 | 6/2002 | Charisius et al. |
| 2002/0077842 | A1 | 6/2002 | Charisius et al. |
| 2002/0077910 | A1 | 6/2002 | Shioda et al. |
| 2002/0080938 | A1 | 6/2002 | Alexander et al. |
| 2002/0082919 | A1 | 6/2002 | Landau et al. |
| 2002/0087388 | A1 | 7/2002 | Keil |
| 2002/0087649 | A1 | 7/2002 | Horvitz |
| 2002/0087740 | A1 | 7/2002 | Castanho et al. |
| 2002/0095399 | A1 | 7/2002 | Devine et al. |
| 2002/0115423 | A1 | 8/2002 | Hatae et al. |
| 2002/0120711 | A1 | 8/2002 | Bantz et al. |
| 2002/0135614 | A1 | 9/2002 | Bennett |
| 2002/0136173 | A1 | 9/2002 | Monroe et al. |
| 2002/0154010 | A1 * | 10/2002 | Tu et al. ................... 340/517 |
| 2002/0165729 | A1 | 11/2002 | Kuebert et al. |
| 2002/0167488 | A1 | 11/2002 | Hinckley et al. |
| 2002/0194305 | A1 | 12/2002 | Sadeghi et al. |
| 2003/0023435 | A1 | 1/2003 | Josephson |
| 2003/0025599 | A1 | 2/2003 | Monroe |
| 2003/0046539 | A1 | 3/2003 | Negawa |
| 2003/0050046 | A1 | 3/2003 | Conneely et al. |
| 2003/0069002 | A1 | 4/2003 | Hunter et al. |
| 2003/0083952 | A1 | 5/2003 | Simpson et al. |
| 2003/0101322 | A1 | 5/2003 | Gardner |
| 2003/0105732 | A1 | 6/2003 | Kagalwala |
| 2003/0126136 | A1 | 7/2003 | Omoigui |
| 2003/0131143 | A1 | 7/2003 | Myers |
| 2003/0154193 | A1 | 8/2003 | Rosenblum |
| 2003/0172368 | A1 | 9/2003 | Alumbaugh |
| 2003/0177402 | A1 | 9/2003 | Piazza |
| 2004/0002988 | A1 | 1/2004 | Seshadri et al. |
| 2004/0083463 | A1 | 4/2004 | Hawley |
| 2004/0128359 | A1 | 7/2004 | Horvitz et al. |
| 2004/0155901 | A1 | 8/2004 | McKee |
| 2005/0091184 | A1 | 4/2005 | Seshadri |
| 2005/0091269 | A1 | 4/2005 | Gerber |

OTHER PUBLICATIONS

Sasu Tarkoma, "Scalable Internet Event Notification Architecture (Siena)", Spring 2002, Helsinki, 9 pages.
Ellen Muraskin, "Notification Engines and Apps", Oct. 5, 2001, www.convergence.com, 11 pages.
"Event Broker/Monitor (Bea Tuxedo System)", 1999, http://edocs.bea.com/wle/wle42/admin/events.htp, 5 pages.
"Configurable Interface for Processing Notifications," Aug. 19, 1999, www.sba.widener.edu/saphelp, 3 pages.
U.S. Appl. No. 10/180,360, filed Jun. 26, 2002, Seshadri, et al.
U.S. Appl. No. 10/375,300, filed Feb. 27, 2003, Seshadri, et al.
U.S. Appl. No. 10/373,328, filed Feb. 24, 2003, Pather, e al.
U.S. Appl. No. 10/375,628, filed Feb. 26, 2003, Pather, et al.
U.S. Appl. No. 10/375,250, filed Feb. 27, 2003, Seshadri, et al.
Bea Systems, "Event Subscription and Notifications", 2000, 4 pages, printed Jul. 25, 2005 from http://e-docs.bea.com/tuxedo/tux71/html/dvlibra7.htm.
Hanson, et al., "A Flexible and Recoverable Client/Server Database Event Notification System", VLDB Journal, 1998, vol. 7, pp. 12-24.
"Interactive Notification Server", www.brience.com, Copyright 2000-2000, printed Mar. 10, 2003, 5 pages.
Steve Trythall, "JMS and COBRA Notification Interworking", Dec. 12, 2001, www.oreilly.com, printed Mar. 25, 2003, 9 pages.
Microsoft Corporation, "Global XML Services Architecture", White Paper, Oct. 2001, 11 pages.

Microsoft Corporation, "An Introduction to Microsoft Transaction Server", Jan. 8, 1998, printed Oct. 21, 2005 from http://msdn.microsoft.com/archive/en-s/dnarmts/html/msdn_mtsintro.asp, 5 pages.

Vassili Bykov, "TOPlink for SmallTalk 5.0: What's new, what's old?", Smalltalk Chronicles, vol. 1, No. 2, Sep. 1999, printed Mar. 19, 2003, 9 pages.

Berndtsson, et al., "Cooperative Problem Solving: A New Direction for Active Databases", 1996, 4 pages, 2 pages of citation.

U.S. Appl. No. 10/180,662, Pather, et al.

U.S. Appl. No. 10/180,159, Seshadri, et al.

Rosenblum, et al., "A Design Framework for Internet-Scale Event Observation and Notification", 1998, 17 pages.

Microsoft Corp., "Microsoft SQL Server Notification Services Technical Overview", Apr. 2002, White Paper, 23 pages.

Rob Taylor, "Transact-SQL", Dec. 20, 2000, SQLTeam.com, 2 pages printed on Jan. 26, 2005 from http://www.sqlteam.com/item.asp?ItemID=1650.

Michael Kantor and David Redmiles, Creating an Infrastructure for Ubiquitous Awareness, Information and Computer Science, University of California, Irvine 92697, 2001.

Bowman, et al. "The Practical SQL Handbook: Using SQL Varients", 2001, pearson technology group, 4th Edition.

Antonio Carzaniga, Design of a Scalable Event Notification Service: Interface and Architecture, Aug. of 1998, U. of Colorado.

Eric Schmidt, "Reliable XML Web Services", Dec. 11, 2001, Microsoft MSDN, 10 pages, last printed on Apr. 7, 2006.

Bernheim Brush, et al., "Notification for shared annotation of digital documents", Apr. 2002, ACM Press, vol. 4, Issue No. 1, pp. 89-96.

Chou, et al., "Versions and change notification in an object-oriented database system", Jun. 1988, IEEE Computer Society Press, Paper 20.4 275-281.

Gruber, et al. "High-level constructs in the Ready event notification system", Sep. 1998, ACM Press, p. 195-202.

OA mailed Oct. 16, 2008 for U.S. Appl. No. 11/565,369, 32 pages.

Stelovsky et al., Software architecture for unified management of event notification and stream I/O and its use for recording and analysis of user events, Jan. 7-10, 2002, IEEE, 1862-1867.

Cabrera et al., Herald: achieving a global event notification service, May 20-22, 2001, IEEE, 87-92.

Fernando Bellas et al., A Flexible Framework for Engineering "My" Portals, WWW 2004, May 17-22, 2004, pp. 234-243, ACM, New York, NY.

Gustavo Rossi et al., Designing Personalized Web Applications, WWW01, May 2001, pp. 275-284, ACM, Hong Kong.

Peter Haddawy, et al., Preference Elicitation via Theory Refinement, Journal of Machine Learning Research, Jul. 2003, pp. 317-337, vol. 4.

Lisa Purvis et al., Creating Personalized Documents: An Optimization Approach, Doc Eng '03, Nov. 20-22, 2003, pp. 68-77, ACM, Grenoble, France.

Woojin Paik et al., Applying Natural Language Processing (NLP) Based Metadata Extraction to Automatically Acquire User Preferences, K-Cap '01, Oct. 2001, pp. 116-122, ACM, Victoria, British Columbia, Canada.

Vincent Trans, International Search Report, PCT/US04/24296 ISA/US, Alexandria, Virgina, US, Nov. 18, 2004, 3 pages.

IBM ADA/6000, Synopsis, www.calply.edu/~ias/userguides/CentralUNIX/world/AIX40105.doc, Sep. 2, 1998, 13 pages.

E.W. Giering. Compile Time Scheduling of an Ada Subset. Washington Ada Symposium Proceedings, Jun. 1990, pp. 143-155.

International Search Report dated Jun. 2, 2005 for PCT Application Serial No. US04/24049, 5 pages.

Bailey, James, "An Event-Condition-Action Language for XML" May 7-11, 2001, http://www2002.org/CDROM/refereed/323.

Microsoft Press Computer Dictionary, Third Edition, 1997.

Microsoft XP, Print Screens.

"Algorithmic Solutions Software GmbH", Oct. 16, 2002, http://www.algorithmic-solutions.com/leda-manual/introduction.html.

Office Action dated Nov. 2, 2005 cited in U.S. Appl. No. 10/375,628.
Office Action dated Apr. 14, 2006 cited in U.S. Appl. No. 10/375,628.
Office Action dated Sep. 29, 2006 cited in U.S. Appl. No. 10/375,628.
Office Action dated Mar. 8, 2007 cited in U.S. Appl. No. 10/375,628.
Office Action dated Sep. 25, 2007 cited in U.S. Appl. No. 10/375,628.
Office Action dated Mar. 25, 2008 cited in U.S. Appl. No. 10/375,628.
Office Action dated Oct. 5, 2005 cited in U.S. Appl. No. 10/373,328.
Office Action dated Mar. 24, 2006 cited in U.S. Appl. No. 10/373,328.
Office Action dated Sep. 28, 2006 cited in U.S. Appl. No. 10/373,328.
Office Action dated Mar. 26, 2007 cited in U.S. Appl. No. 10/373,328.
Office Action dated Dec. 28, 2007 cited in U.S. Appl. No. 10/373,328.
Office Action dated Jun. 26, 2008 cited in U.S. Appl. No. 10/373,328.
Notice of Allowance dated Jan. 6, 2009 cited in U.S. Appl. No. 10/373,328.
Office Action dated Jan. 22, 2007 cited in U.S. Appl. No. 10/693,735.
Office Action dated Jun. 21, 2007 cited in U.S. Appl. No. 10/693,735.
Office Action dated Feb. 17, 2007 cited in U.S. Appl. No. 10/693,735.
Office Action dated Jun. 10, 2008 cited in U.S. Appl. No. 10/693,735.
Office Action dated Feb. 19, 2009 cited in U.S. Appl. No. 10/693,735.
Notice of Allowance dated Aug. 19, 2009 cited in U.S. Appl. No. 10/693,735.
Office Action dated Oct. 20, 2005 cited in U.S. Appl. No. 10/375,250.
Office Action dated Mar. 14, 2006 cited in U.S. Appl. No. 10/375,250.
Office Action dated Aug. 22, 2006 cited in U.S. Appl. No. 10/375,250.
Notice of Allowance dated Feb. 7, 2007 cited in U.S. Appl. No. 10/375,250.
Office Action dated Feb. 14, 2006 cited in U.S. Appl. No. 10/375,300.
Office Action dated Jul. 26, 2006 cited in U.S. Appl. No. 10/375,300.
Office Action dated Dec. 20, 2006 cited in U.S. Appl. 10/375,300.
Office Action dated Jun. 1, 2007 cited in U.S. Appl. No. 10/375,300.
Notice of Allowance dated Jan. 17, 2008 cited in U.S. Appl. No. 10/375,300.

* cited by examiner

FRAMEWORK FOR PROVIDING A SUBSCRIPTION BASED NOTIFICATION SYSTEM

REFERENCE TO RELATED APPLICATION(S)

This application is a continuation in part of U.S. patent application Ser. No. 10/180,360 which was filed Jul. 26, 2002, now abandoned entitled System and Method for Providing Notification(s), the entirety of which is incorporated herein by reference.

TECHNICAL FIELD

The present invention relates generally to computer systems, and more particularly to a system and method for delivering notifications in accordance with various applications that facilitate subscribing and interfacing to a notification platform.

BACKGROUND OF THE INVENTION

Empowering people to make well-informed decisions has become increasingly important in today's fast-paced environment. Providing individuals with relevant and timely information is an essential element in facilitating such well-informed decisions. However, certain information that is noise to some may be very valuable to others. Additionally, some information can also be temporally critical and as such there may be significant value associated with timely delivery of such information. Moreover, some individuals prefer to stay apprised of information, even though not critical. A challenge is to provide information in a desired manner notwithstanding vast differences in individuals' information and delivery preferences.

Many conventional methods of gathering information require proactively requesting and searching for the information, often mandating sifting through dozens of messages, hundreds of articles, or referencing numbers or trends in reports. Furthermore, existing technologies assume that a person desiring such information is at a computer and has time and ability to retrieve the information. Moreover, people are increasingly mobile and cannot always be within close proximity of a computer. As a result, Internet-enabled mobile devices are becoming increasingly popular and have generated demand for services that deliver timely, personalized information regardless of location, on whatever suitable device is available and accessible.

Some have attempted to accommodate such demand by building systems that allow individuals to subscribe to an application that automatically delivers information of interest. However, most of such information delivery systems have been poorly built employing ad-hoc techniques. Additionally, conventional systems have difficulty with respect to scaling because of the complexity associated with processing meaningful queries in connection with a large number of disparate events or publications, and delivering results to subscribers given the varying types of individual delivery preferences as well as recipient device types. Consequently, conventional notification systems are inefficient, difficult to maintain and administer, unreliable, and are inadequate for hosting large-scale applications.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology for delivering notifications in accordance with a notification platform. One or more application models are provided that facilitate efficient and timely delivery of notifications. The application models can be incorporated within and/or associated with the notification platform to provide users with an adaptable and configurable interface or platform for adjusting the types, timing and/or amount of notifications. The models can be driven from a device end when receiving notifications if desired, wherein users can configure a plurality of parameters that define one or more delivery guidelines. Also, these guidelines can be stored/driven at the platform end for maintenance of global parameters or if devices are limited in capabilities, for example. Moreover, the models can be employed to enhance subscription experiences for users, whereby users can easily and economically subscribe and unsubscribe to one or more notification services. In addition, subscriptions can be dynamically adjusted based upon explicit commands from the user, inferred from contextual user states, and/or based upon incentives or other factors directed to the user.

According to one aspect of the present invention, the application models described above include a brokering model that receives notification specifications from users and based upon the specifications, brokers or links notification services/providers to meet or satisfy such specifications. A dynamic pricing model can be provided, wherein an organization or other type grouping may be given subscription discounts based upon the number of subscribers in the group. Other type pricing may include usage-based pricing, whereby service discounts or pricing is offered to subscribers based upon the amount of time a service has been used or the volume at which a service has been consumed by the subscriber (e.g., for every 10 hours of service purchased, 1 hour of service is added for free). In yet another model, a subscription access model can be employed to facilitate efficient subscribing and un-subscribing to services. For example, a user may desire to subscribe to a multi-provider news source during a critical event such as a space disaster, yet, after a time, desire to discontinue the service (e.g., automatic, manual and/or predetermined considerations).

Other type models include push and pull type models that enable users to adjust the amount and type of notification based upon incentive or other factors. In one push example, a user may be offered an incentive such as a free stock notification service for a month if willing to except an alternative notification service. In a pull type example, the user controls if and when notifications outside of a predetermined subscription path may be acceptable for reception. Device and filtering models can also be provided that enable users to control how notifications are received. In some cases, users may desire different delivery circumstances or conditions based upon the type of device at their disposal. Filtering can be provided to mitigate the amount of unwanted notifications. Another aspect of the present invention includes notification platform interactions with an automated billing and subscription service. Thus, notifications can be generated that are based upon subscription information associated with the billing service and can include such aspects as mass billing via notifications, wherein the billing service determines the amounts, users, and/or entities to be billed/contacted.

In general, the above framework and protocols are adapted to an automated notification system that facilitates providing notification services via a notification architecture that is highly scalable and can process a large volume of queries with respect to a plurality of disparate subscription service providers and subscribers. One aspect of the subject invention provides for a distributed notification platform that facilitates building and maintaining reliable, high performance, and scalable applications. More particularly, the platform of the subject invention provides a manner in which to express event schema, subscription schema, notification schema, and rules in a rich manner (e.g., XML) as well as allowing a subscription service provider to express content formatting and protocols that can be implemented in connection with distributing notifications. The invention includes an execution engine that integrates information propagated in accordance with the aforementioned schema, formatting and protocols to provide highly scalable notification services.

Another aspect of the invention provides for abstracting subscription and subscriber information (as well as event information if desired) to high-level classes (e.g., data fields)—thus the invention provides for modeling such notification related information as data. Subscription applications can thus be developed at high levels wherein complex subscription queries and subscriber information can be defined as data fields for example. Databases in accordance with the data fields can be propagated with subscription/subscriber specific information. The present invention takes advantages of the processing power associated with database engines (e.g., SQL server) to generate notifications via performing a join operation on the tables (e.g., subscription table(s), subscriber table(s) and event table(s)). Accordingly, notifications are generated en masse, as compared to per subscription per subscriber which can consume significant computing resources. By modeling the notification related information (e.g., subscription queries, subscriber information, event information . . . ) as data and leveraging the power of relational database systems to perform set-oriented manipulations on this data efficiently, the present invention provides for a highly scalable and efficient notification system.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
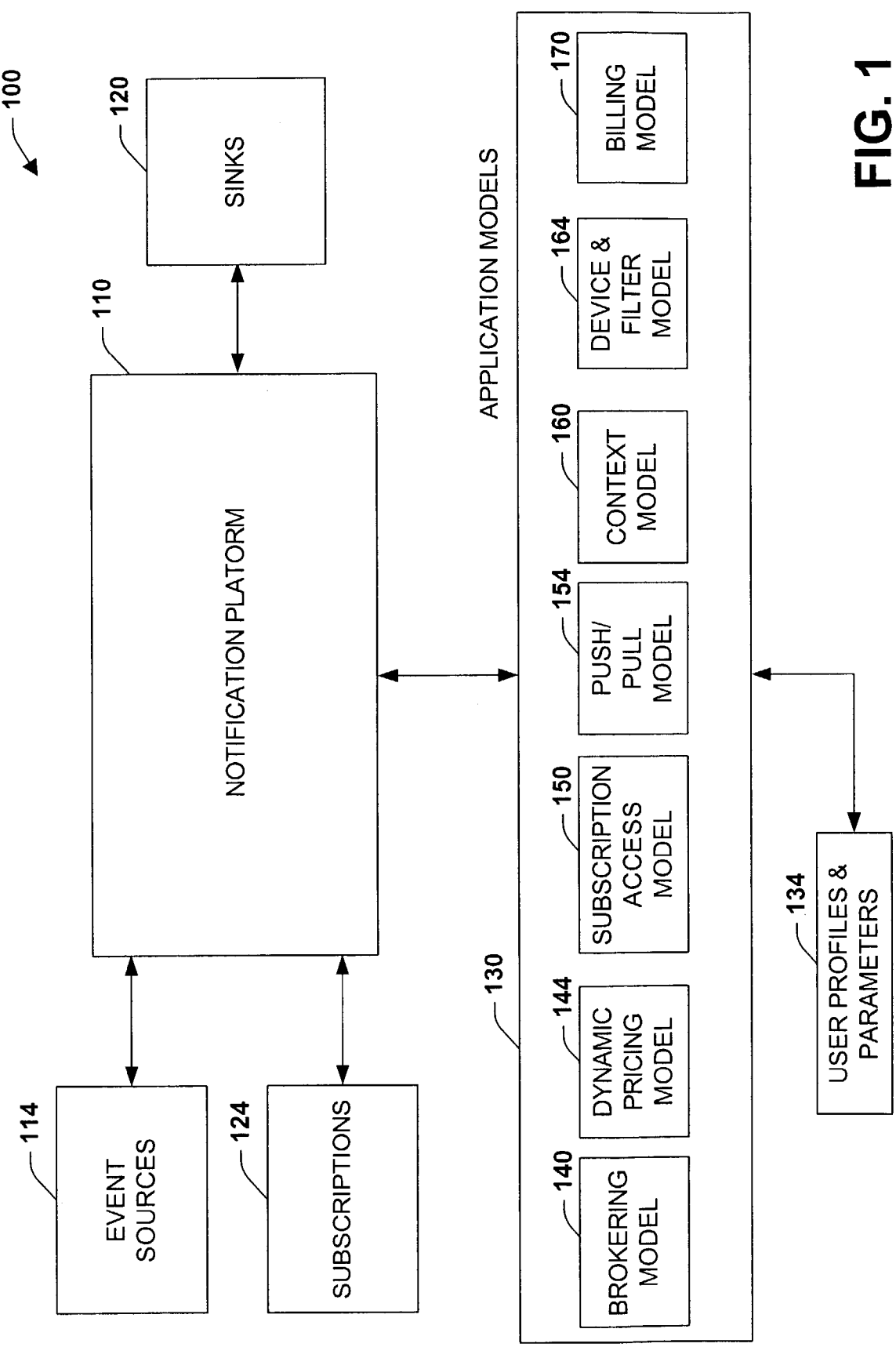
FIG. 1 is a schematic block diagram of a notification delivery system and application models in accordance with an aspect of the present invention.

The present invention relates to a system and methodology to facilitate automated delivery of notifications according to various applications that can be employed with the framework of a notification platform. The applications are described by models that enable users to easily/conveniently interact with the notification platform. One such model includes a brokering model acting as a third party to receive user definitions of desired services and then chains such services in order to deliver a service bundle to the user in accordance with the platform. A dynamic pricing model can be provided to facilitate delivery of services according to various factors such as volume pricing discounts for notification services. A subscription access model is provided to enable users to conveniently subscribe and un-subscribe to services, whereas a push/pull model may be employed to give users one or more options regarding delivery of alternative services. A context model can be provided that enables users to alter their subscriptions based upon current contextual states (e.g., if I am on vacation, discontinue service until I get back). A device filter model provides users with controls for varying the types and amounts of notifications (e.g., only allow subscribed notifications, allow notifications from users A and B in the morning, allow notifications from Users A and C in the afternoon). A billing model includes describing interactions between an automated billing and subscription service and one or more interactions of the notification platform, wherein subscription events/messages relating one or more users in the billing system can be delivered to the user via the notification platform (e.g., service has been discontinued, your account has been billed $10.00 for last month's subscription usage).

As used in this application, the terms "component," "model," "protocol," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a notification delivery system 100 is illustrated in accordance with an aspect of the present invention. The system 100 employs a notification platform 110 to distribute information from one or more event sources 114 that generate notifications to one or more notification sinks 120 that receive information from the sources. In order to receive information from the event sources 114, one or more subscriptions 124 are obtained to determine which of the event sources should cause automated notifications to occur at the notification sinks 120. For example, a news subscription may include notifications from three different news sources such as a breaking news source, a sports source, and a business news source. If a subscriber has suitably subscribed to this type news subscription, then notifications that are generated from any of the three sources can be passed to the notification sinks 120, wherein the notification platform 110 selects when and if information from the event sources 114 is passed or routed to the sinks. In another example, information gathered from various stock sources may be passed in accordance with a financial service that delivers stock notifications to the sinks 120.

It is noted that the notification platform 110 can include various components such as an SQL server(s) that processes data from a plurality of event sources 114, and performs join operations to distribute notifications to the sinks 120, wherein the notification platform 110 performs various database and communications operations. The notification platform 110 can thus collect or aggregate information from one or more of the event sources 114 and distribute the collected information to the notification sinks 120. It is also noted that various systems and components can be provided to facilitate operations between the notification platform 110, event sources 114 and notification sinks 120 which are described in more detail below.

One or more application models 130 are provided that facilitate efficient and timely delivery of notifications. The application models can be incorporated within and/or associated with the notification platform 110 to provide users with an adaptable and configurable interface or platform for adjusting the types, timing and/or amount of notifications, for example. In addition, the application models 130 can be associated with and/or incorporated within the event sources 114, the notification sinks 120, and/or subscriptions 124. The models can be driven from the notification sinks 120 when receiving notifications if desired, wherein users can configure a plurality of parameters that define one or more delivery guidelines. Also, these guidelines can be stored/driven at the platform end 110 (or other components) for maintenance of global parameters or if devices are limited in capabilities, for example. As illustrated, user profiles and/or parameters 134 can be provided that capture/infer the users' desires when receiving notifications. These profiles/parameters 134 can be maintained as a file or as structured relational data on one or more of the components illustrated in the system 100.

The application models 130 can be employed to enhance subscription experiences for users, whereby users can easily and economically/automatically subscribe and unsubscribe to one or more notification services. In addition, subscriptions 124 can be dynamically adjusted based upon explicit commands from the user, inferred from contextual user states, and/or based upon incentives or other factors directed to the user as will be described in more detail below.

According to one aspect of the present invention, the application models 134 include a brokering model 140 that receives notification specifications from users and based upon the specifications, brokers or links notification services/providers to meet or satisfy such specifications (e.g., I want a sports subscription where I receive notifications from ESPN and three Las Vegas Hotels). The brokering model 140 may then search for service providers that supply the requested services, bundle the specifications into a subscription 124, and communicate subscription information to the notification platform 110 (e.g., a message or data that informs notification platform to send notifications from specified notification services to user).

A dynamic pricing model 144 can be provided in accordance with another aspect of the present invention, wherein a group or grouping may be given subscription discounts based upon the number/type of subscribers in the group (e.g., all subscribers from company A get 10% discount). Other type pricing may include usage-based pricing, whereby service discounts or pricing is affected by the amount of time or volume service has been consumed. As can be appreciated, the dynamic pricing model 144 can employ a plurality of factors and factor combinations to change or alter subscription pricing. For example, users may be given discounts during certain times of the day or based upon their location for receiving notifications. Discounts can be in non-monetary form such as users who fall into a usage category may be given a credit for another type of subscription (e.g., all users of a health care alerts receive credit toward nutrition alerts). In yet another model, a subscription access model 150 can be employed to facilitate efficient subscribing and un-subscribing to services. For example, a user may desire to subscribe to a multi-provider news source during a critical event such as a stock market crash, yet, after a time or other factor desire to discontinue the service. Such models 150 can facilitate sporadic or intermittent use of services that is more in-line with the user's notification desires (e.g., I only want to subscribe for two hours, I want to subscribe in the morning and unsubscribe at night, I want a 17 day subscription).

Other type application models 134 include push and pull type models 154 that enable users to adjust the amount and type of notification based upon incentive or other factors. In one example, a user may be offered an incentive (e.g., notification pushed from platform 110) such as a free mail notification service for a month if willing to except an alternative notification service. Other incentives can be broadly based such as if you accept 10 advertising notifications per month, you will be credited on one or more of your current services. In another example, the user controls if and when notifications outside of a predetermined subscription path may be acceptable for reception. Thus, the user may initiate controls in the user profiles and parameters 134 that indicate the user's desire to pull additional information from the platform 110 than what is currently being received.

A context model 160 can be employed to dynamically alter subscriptions 124 and/or cause changes in the automated actions of the notification platform 110. For example, users may desire to subscribe to a service only during a particular context and subscribe unsubscribe to other services during a different context (e.g., During work, I want my home hobby subscription to be disabled, when I am not busy, I am willing to subscribe to three entertainment notification services). Device and filtering models 164 can also be provided that enable users to control how notifications are received. In some cases, users may desire different delivery circumstances or conditions based upon the type of device at their disposal (e.g., when I only have access to my cell phone, I want my desktop subscriptions deactivated). Filtering can be provided to mitigate the amount of unwanted notifications in accordance with various filtering options such as junk/SPAM mail filters and/or user-defined rules. In another aspect, a billing model 170 includes notification platform interactions/functions with an automated billing and subscription service. Thus, notifications can be generated that are based upon subscription information associated with the billing model 170 and can include such aspects as mass or focused billing via notifications generated by the notification platform 110, wherein the billing model determines the amounts, users, entities and/or other factors to be billed/contacted. It is noted that one or more of the application models 134 may be employed and/or adapted to cooperate in accordance with various combinations of the present invention. For example, in one aspect the push/pull model 154 may be adapted to operate with the subscription access model 150. In another example, the brokering model 140 may be adapted with the context model 160, the billing model 170 and so forth.

Figure 2:
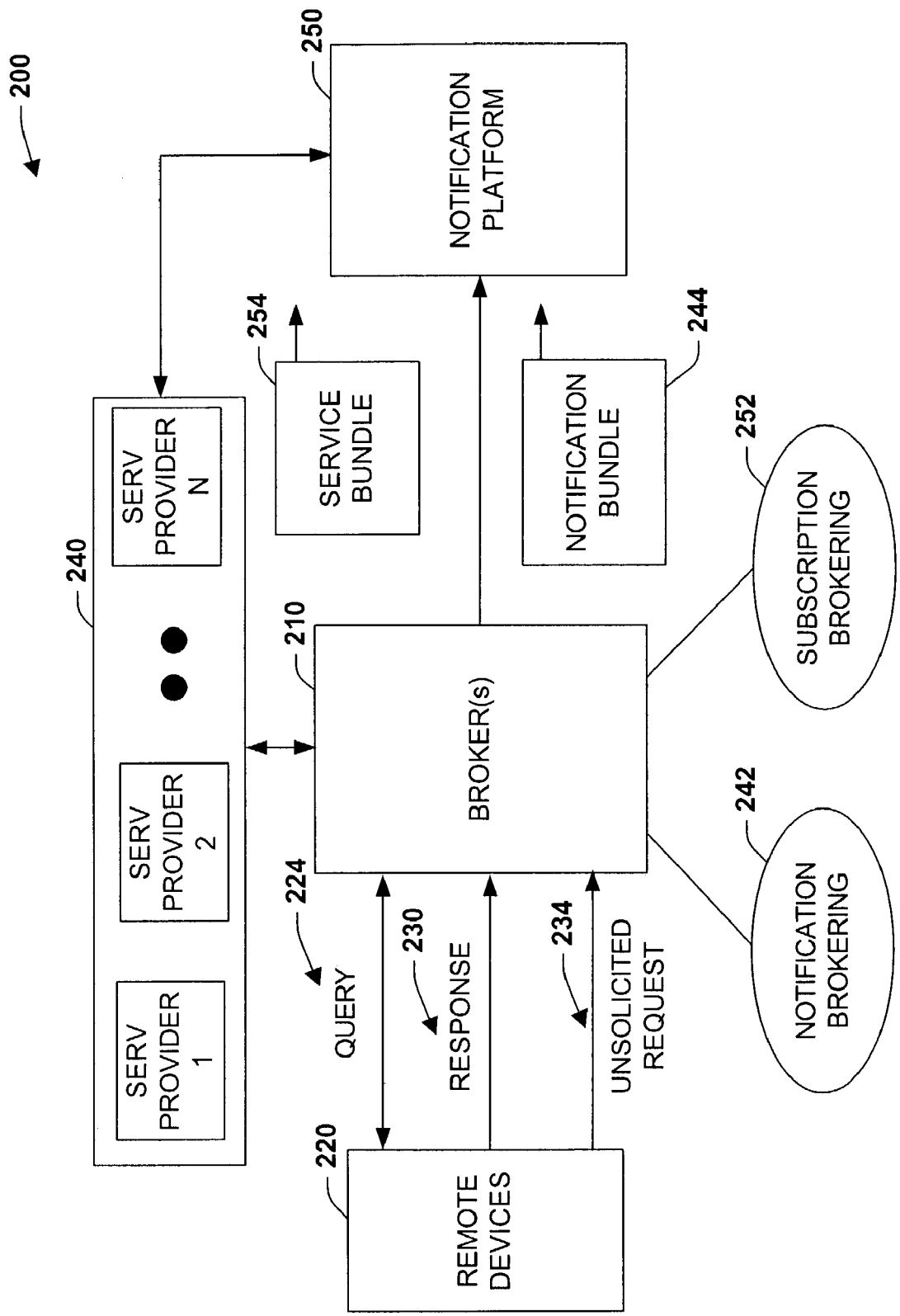
FIG. 2 is a schematic block diagram illustrating a brokering system in accordance with an aspect of the present invention.

Referring now to FIG. 2, a brokering system 200 is illustrated in accordance with an aspect of the present invention. In this aspect of the present invention, a notification broker 210 (or brokers) queries a remote device 220 (or devices) at reference numeral 224 (can also include queries being directed from remote device to broker). The query 224 can include an offer for notification services such as an e-mail, network posting, cell-phone message, pop-up window and so forth. The remote device 220 which can include substantially any type of notification sink as is described in more detail below, directs the query 224 to an interface (not shown) (e.g., display, text message), wherein a user of the device determines whether or not to subscribe to the query (e.g., web query asking user to select a service or subset of services from a list). Thus, a query response 230 can be generated by the remote device 220 indicating whether or not the user desires to subscribe to one or more notification services offered in the query 230 (e.g., flag response indicating yes or no, list selections, schema response indicating counter offer or other conditions). In another aspect of the invention, the user directs the remote device 220 to deliver an unsolicited response or query 234 to the broker 210 requesting/specifying one or more services in which to subscribe.

After receiving a response for notification services, the broker 210 then (or before the query) assembles a notification subscription. For example, the broker 210 can negotiate with one or more service providers 240 to determine if the service providers can deliver requested notification services. In one example, the user of the remote device 220 may specify, "I want a notification service that delivers general business alerts, alerts specific to Company X, banking alerts that affect my savings account, and breaking local or national news." The broker 210 then solicits or determines which of the service providers 240 can then generate notifications or notification events relating to the user's response 230 and/or unsolicited request 234.

In one aspect of the present invention, the broker 210 can provide notification brokering 242, whereby the broker queues up notifications relating to the user's request and delivers the notifications in a notification bundle 244 to a notification platform 250 which then disperses the notifications to the user at the remote device 220 (or devices). In another aspect, the broker 210 performs subscription brokering 252 and determines available service providers 240 that can deliver the requested notification services. After the determination, the broker 210 generates a service bundle 254 (e.g., file or schema describing components of notification service and service providers supplying components) and delivers the bundle to the notification platform 250 as a subscription. The notification platform 250 then sets up a response to any event indicated in the service bundle 254, wherein if a notification is generated from the bundle, the notification platform 250 then directs such notifications to the remote device 220 and/or notification sink associated with the bundle. As can be appreciated, the user can specify which devices to receive notifications in addition to describing or defining the types of services that they desire to receive notifications from. Furthermore, account management (e.g., charging user account for delivered notifications) for delivered services can be provided by the broker 210, the notification platform 250 and/or in accordance with an automated billing and subscription service/system which is described in more detail below.

Figure 3:
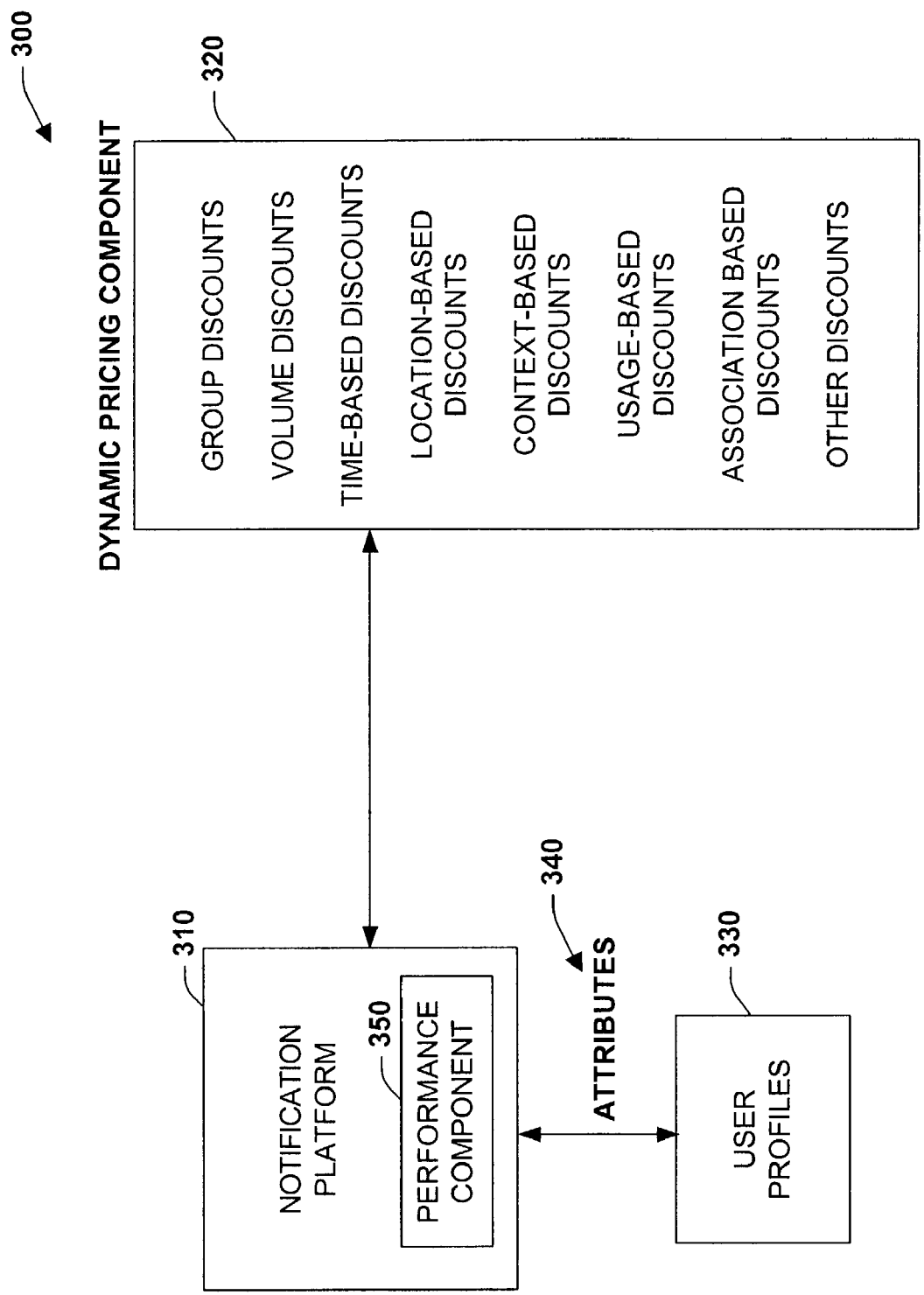
FIG. 3 is a diagram illustrating a dynamic pricing system in accordance with an aspect of the present invention.

Turning to FIG. 3, a dynamic pricing system 300 is illustrated in accordance with an aspect of the present invention. In this aspect, a notification platform 310 interacts with a dynamic pricing component 320 which is a file or storage medium containing rules or guidelines from which subscription pricing or delivery conditions can be changed or altered. In order to determine if the pricing options contained in the dynamic pricing component 320 applies to a user, subset of users, and/or group, a user profile 330 is provided that is associated with such users/group (e.g., profiles associated with notification sinks/platform), providing one or more attributes 340 indicating information about users such as memberships in a selected group and pattern information relating to utilization of notification services. The notification platform 310 then employs a performance component 350 to determine if the attributes 340 qualify for pricing promotions or discounts described by the dynamic pricing component 320. For example, if a price discount is given for membership to a group, and the attributes 340 indicate a user is a group member, then the respective user may qualify for a group discount (assuming pricing component so configured) via the performance component 350.

The dynamic pricing component 320 includes one or more guidelines that enable users to receive pricing adjustments while subscribing to notification services. As noted above, this can include group discounts, wherein the notification platform 310 offers discounts (e.g., monetary/usage credits) to users who qualify as members of the group. In another aspect, volume discounts may be given. Thus, if one or more users subscribe to a predetermined number of services, volume discounts can be applied based upon attaining or subscribing to the predetermined number or obtaining a predetermined threshold. Other discounts offered by the dynamic pricing component 320 include time-based considerations. For example, users may be discounted on services subscribed to based on the time of day, week or other component such as the month. Thus, some notification services may incentivize users to employ services during selected times. Similar considerations can be given to the location where users are based. For example, all users who reside in California/IP address (or other location) receive a free week of service (or other incentive).

Another consideration or guideline can be context-based discounts or adjustments (e.g., all users who are currently in a non-busy state receive a vacation notice). Other considerations involving context and subscriptions will be described in more detail below in relation to FIG. 6. Another pricing consideration can be usage-based (e.g., all users who utilize notification platform more than X minutes/month receive a discount). Still yet other pricing considerations include association-based adjustments. Such adjustments can include offering service or discounts based upon usage or subscription to other identified services (e.g., for all users signed up for news service, sports service being added at no additional cost).

Figure 4:
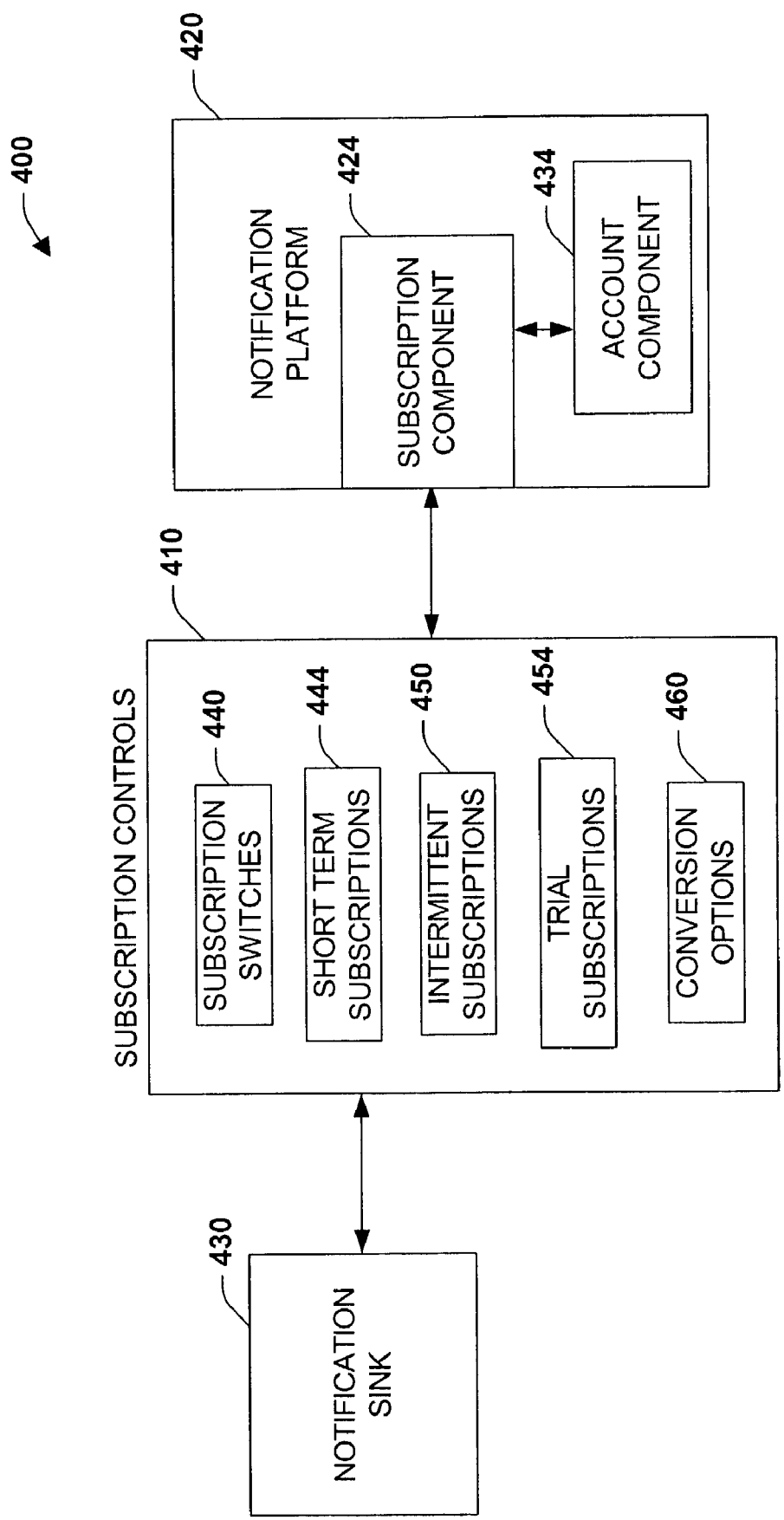
FIG. 4 is a diagram illustrating a subscription control system in accordance with an aspect of the present invention.

FIG. 4 illustrates a subscription control system 400 in accordance with an aspect of the present invention. According to this aspect, one or more subscription controls 410 are provided to facilitate subscribing and/or un-subscribing to notification services offered by a notification platform 420. The notification platform 420 includes a subscription component 424 for enabling and disabling subscriptions that are routed to one or more notification sinks 430. An account component 434 can also be provided in order to track service usage and credit or bill according to an associated service agreement or contract between users operating the notification sink 430 and the notification platform 420.

The subscription controls 410 (e.g., file or schema) provide various mechanisms for subscribing and un-subscribing to services. In one aspect, subscription switches or flags 440 may be provided that can be turned on or off by buttons or graphical user interface components provided at the notification sink 430 (e.g., if green button selected, I am now subscribing to financial service, voice encoded or activated flag indicating I want to un-subscribe to service). In another aspect, short-term subscriptions 444 may be indicated. Such subscriptions include options such as I want to subscribe for one hour, or two days, or other time, wherein the term can be entered at the notification sink 430. Another control includes intermittent subscriptions at 450 (e.g., I want to subscribe for Monday and Tuesday and un-subscribe until Sunday). Another type control includes enabling users to select trial subscriptions at 454 (e.g., I want to subscribe for trial period at which time my subscription automatically terminates). At 460, one or more conversion options can be selected. Such options include converting one type of subscription for another (e.g., replace my sports subscription with health notification subscription) and converting one term for another (e.g., convert long term subscription to short term, convert trial subscription to permanent subscription). As can be appreciated various combinations and options can be provided with the subscription controls 410 to facilitate subscribing and/or un-subscribing to services.

Figure 5:
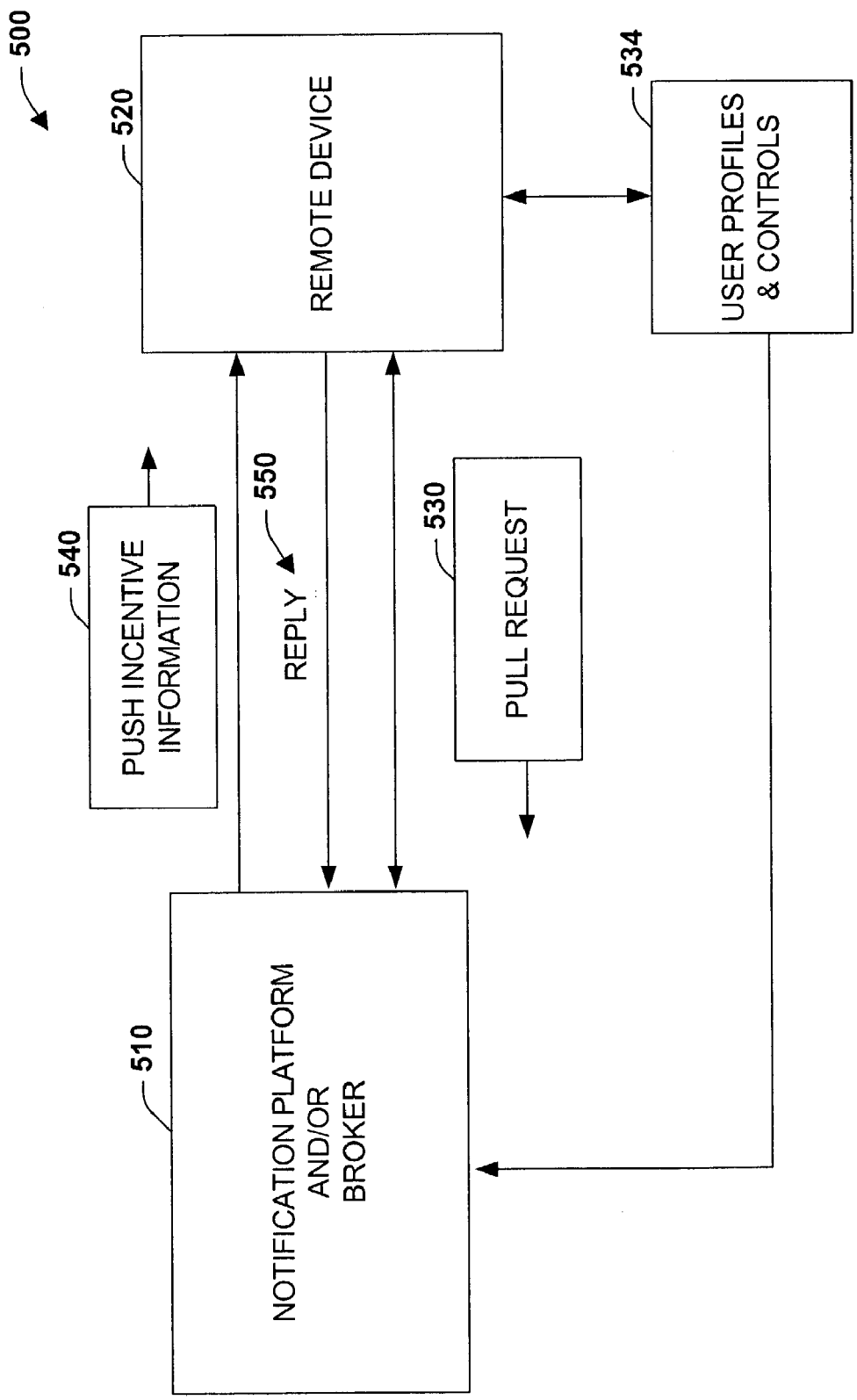
FIG. 5 is a diagram illustrating a push/pull system in accordance with an aspect of the present invention.

FIG. 5 illustrates a push/pull system 500 in accordance with an aspect of the present invention. In this aspect, other notifications (outside of subscribed notifications) may be exchanged between a notification platform 510 (can include brokers) and a remote device 520. In one aspect, a pull-request 530 is generated by the remote device 520 in order to determine what services are offered by the notification platform 510. This can include setting controls within a user profile 534 that permit the notification platform 510 to send non-subscribed notifications or messages. For example, the remote device 520 may desire to receive unsolicited notices or ads (until controls altered in user profile) that promote various services within the platform 510. Such information could include pricing and comparison information to other services for example. This can also include receiving sample notifications from a plurality of differing or similar/competitive sources.

In another aspect of the present invention, incentive and/or other type information may be pushed to the user at 540. In one example, the user may be offered a plurality of offers, incentives, and/or options at 540 that attempt to induce the user to employ respective services. For example, an incentive may be phrased such as "If you subscribe to sports service, you will be given 50% off of your news service." Another example includes "If you agree to receive unsolicited advertising via notifications during the 6:00 hour, you will receive free service for a month." As can be appreciated a plurality of such incentives can be offered. If the user operating the remote device 520 decides to accept/reject an offer, the user can select a menu option or device mechanism that routes a reply 550 back to the notification platform 510. It is noted that the user can set controls in the user profiles 534 that can mitigate or eliminate any push type notifications.

Figure 6:
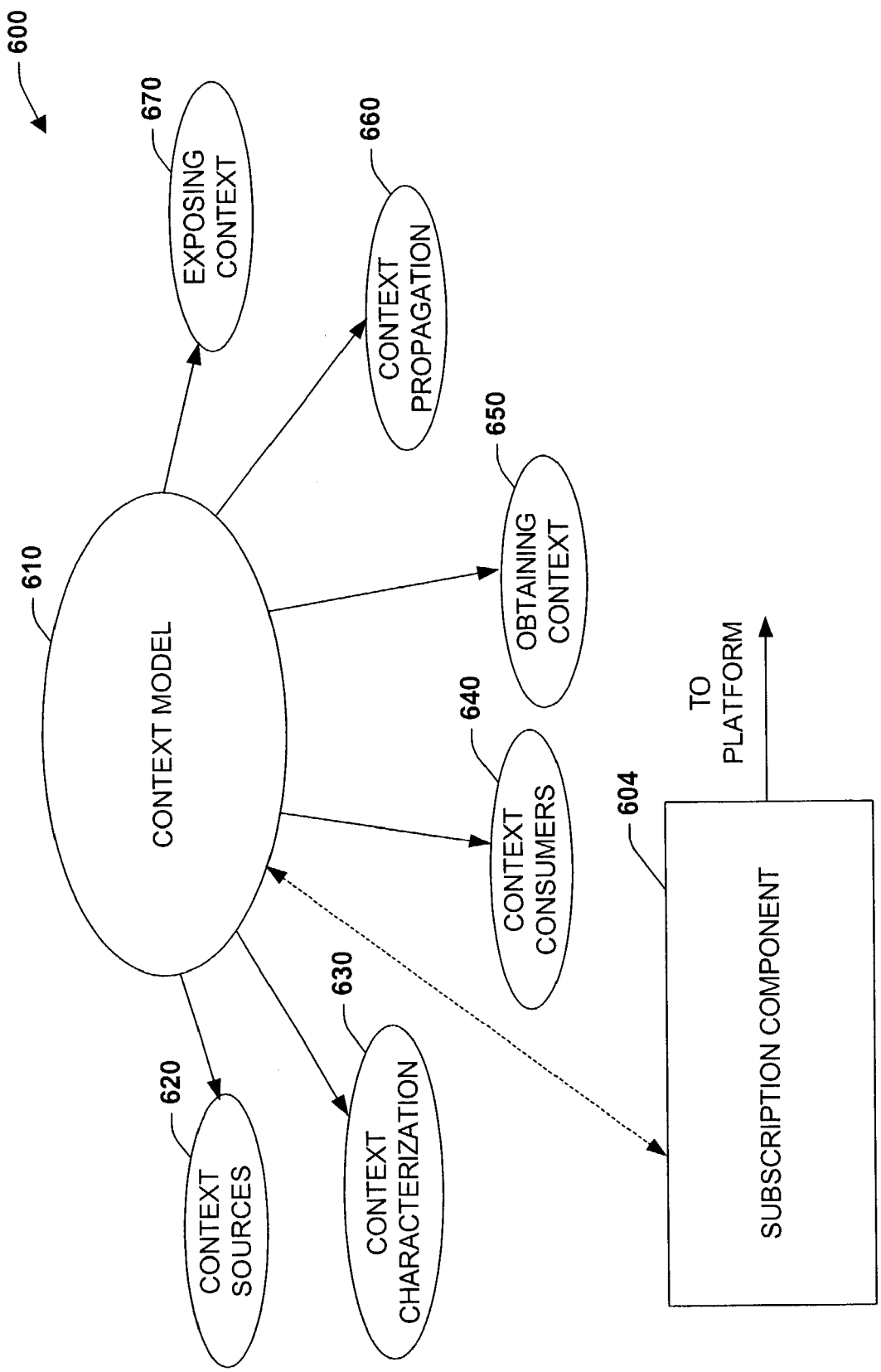
FIG. 6 is a diagram illustrating subscription and context components in accordance with an aspect of the present invention.

FIG. 6 illustrates subscription and context components 600 in accordance with an aspect of the present invention. In this aspect, user context can be employed to control subscription activities. For example, a subscription component 604 can have one or more subscriptions activated or deactivated depending on context information derived from a context model 610. In one aspect, depending on context state or other context data, a subscription can be subscribed to or un-subscribed to based upon one or more aspects provided by the context model 610. As an example, some users may want a certain type of notification depending on a detected context, yet, they may not want to subscribe to the service during times when their context would not permit receiving notifications due to their current activities (e.g., when my context is work, un-subscribe to hobby notification sources and subscribe to professional sources). As can be appreciated, the subscription component 604 may not actually activate and deactivate a subscription but merely credit a user's account during periods in which their context or rules specifying context would not permit adequate reception of notifications. Other aspects associated with the context model 610 and that may alter or influence the subscription component 610 are described below.

Context Information (or Context) is information regarding the user and the user's activities that enable a system to intelligently generate and route notifications on the user's behalf. Examples of context information include:
  Instant Messenger presence information
  Exchange calendar information
  Physical location information as reported by the cell phone network or a GPS receiver
  Information collected by the user's system such as whether the user is typing on the keyboard, clicking the mouse, or running an application in full screen model.

Context information typically originates from Context Sources 620 and is used by Context Consumers such as the subscription component 604. Context information may be propagated from context sources 620 to context consumers by a Context Service. The location of the context source 620 is the Context Origin (or Origin). The location of the context consumer is the Context Destination (or Destination).

Context information can be supplied by a wide variety of context sources 620. These include:

Hardware Context Sources

The system can gather context information by monitoring the status of hardware devices.
1. Keyboard activity.
2. Mouse activity.
3. Phone activity (phone turned on/off, phone conversation underway, etc.)
4. PDA activity.
5. Physical location within the cell phone network.
6. Physical location as reported by a GPS receiver.
7. Web camera linked to image recognition.
8. Microphone linked to voice recognition.
9. Motion sensor.
10. Infrared sensor.

Software Context Sources

The system can gather context information from the operating system and from instrumented applications.
1. Windows
   a. The user is logged in.
   b. The user is running a full screen application.
2. Exchange
   a. Exchange is being used to read e-mail.
   b. Exchange calendar data.
   c. Exchange "Out of Office" status.
3. IM
   a. The IM client is being used to send and receive IM messages.
   b. User entered IM status
4. Internet Explorer or other browser
   a. IE is being used to browse the web.
5. Office
   a. Powerpoint is being used to give a presentation mode.
   b. Outlook is being used to browse e-mail.
   c. Word or Excel is being used to author a document.
6. Windows Media Player
   a. Windows Media Player is being used to play music or video.
7. Third party applications may provide context information.

Pattern Detection Context Sources

The system and application programs can deduce context information by recognizing patterns of behavior. For example, the system might recognize that a user normally logs in and logs out at predictable times on weekdays.

At 630, context characterization can occur.

Context information can be characterized as follows.

Context Source
   Specifies who provides the context.

Context Consumer
   Specifies who consumes the context.

Utility
   Specifies how useful the context information is in generating or routing notifications. Utility is designated as: High, Medium, or Low (or other designation).

Accuracy
   Specifies how much trust the system can place in the context information. Some context information is absolutely accurate and trustworthy; other context information may be heuristic or only partially reliable. Accuracy is designated as: High, Medium, or Low (or other designation).

Sensitivity
   Specifies how much effort the system must expend to safeguard the context information from unintended disclosure. Sensitivity is designated as: High, Medium, or Low (or other designation).

Origin/Destination/Propagation Distance
   Origin specifies the location where the context information originates. Origin is designated as: Desktop, Device, Enterprise Server, Network Service, Carrier Network, and so forth. Destination specifies the location where the context information is consumed. Destination is designated as: Desktop, Enterprise Server, Network Service, and so forth. Propagation distance specifies how far the context information must be propagated to move it from the origin to the destination. Propagation Distance can be designated as: Local (or Intra system), Intranet, or Internet. The propagation distance may influence the performance, reliability, and security of context information propagation.

Volatility
   Specifies how frequently the context information changes at the context source. Volatility is designated in terms of changes per Second, Minute, Hour, Day, Week, Month, or Year.

Access Frequency
   Specifies how frequently the context information is accessed by the context consumer. Access frequency is designated in terms of accesses per Second, Minute, Hour, Day, Week, Month, or Year.

Size
   Specifies how much context information is provided, propagated, cached, and consumed. Size is designated in terms of bytes.

User Effort to Maintain
   Specifies how much effort the user must expend to maintain accurate context information. It can be presumed that context information that the system automatically maintains on the users behalf and that requires no user effort is more likely to be maintained than context information that the user must maintain manually. It is also likely to be more accurate. User Effort to Maintain is designated as: High, Medium, or Low.

At 640, Context Consumers can be characterized.

Context consumers can be characterized as follows.

Context Consumer
   Who is the context consumer?

Context Consumer Location
   Is the context consumer local to the context source or remote from it?

Context Requirements
   What context does the context consumer require? What form of context does the context consumer require: current context from one or more individual context sources, context status changes from one or more individual context sources, summarized context from multiple context sources?

Context Access Frequency
   How frequently does the context consumer access context?

Context Freshness
   How current or fresh must the context be?

Context Latency
   How long can the context consumer afford to wait to acquire fresh context?

At 650, the context model describes Obtaining Context from Context Sources.

The context source can supply context information to a context service in the following manner:

Push on Change

The context source can push the context information to the context service each time the context information changes (or each time the context information changes but no more frequently than a specified interval).

Push on Schedule

The context source can push the context information to the context service on a specified schedule.

Pull on Schedule

The context service can pull context information from the context source on a specified schedule.

Pull on Demand

The context service can pull context information from the context source only when a context consumer requires the context information.

At 660 Context Propagation is considered.

When the context service receives the context information, it can propagate the context information from the origin to the destination in the following manner. It is noted that the context source can supply context information to the context service using one model, while the context service can use a different model to propagate the context information from the origin to the destination.

Push on Change

The context service at the origin can push the context information to the destination each time the context information changes (or each time the context information changes but no more frequently than a specified interval).

Push on Schedule

The context service at the origin can push the context information to the destination on a specified schedule.

Pull on Schedule

The context service at the destination can pull context information from the origin on a specified schedule.

Pull on Demand

The context service at the destination can pull context information from the origin when a context consumer requires the context information.

If the origin contains a Notification Services instance, the context service can implement the above models using event triggered or scheduled Notification Services subscriptions. Push on Change can be implemented as an event triggered subscription. Push on Schedule and Pull on Schedule can be implemented as a scheduled subscription. Pull on Demand can be implemented as a "one-time" scheduled subscription.

At 670, the model exposes Context information to Context Consumers. Context is consumed by rules running within a Notification Services generator or Information agent router. Rules retrieve context information by calling context functions that retrieve context information from a context class's underlying context tables. In view of the above, the subscription component 604 can employ one or more aspects of the context model 610 when determining whether to activate or deactivate a respective subscription.

Figure 7:
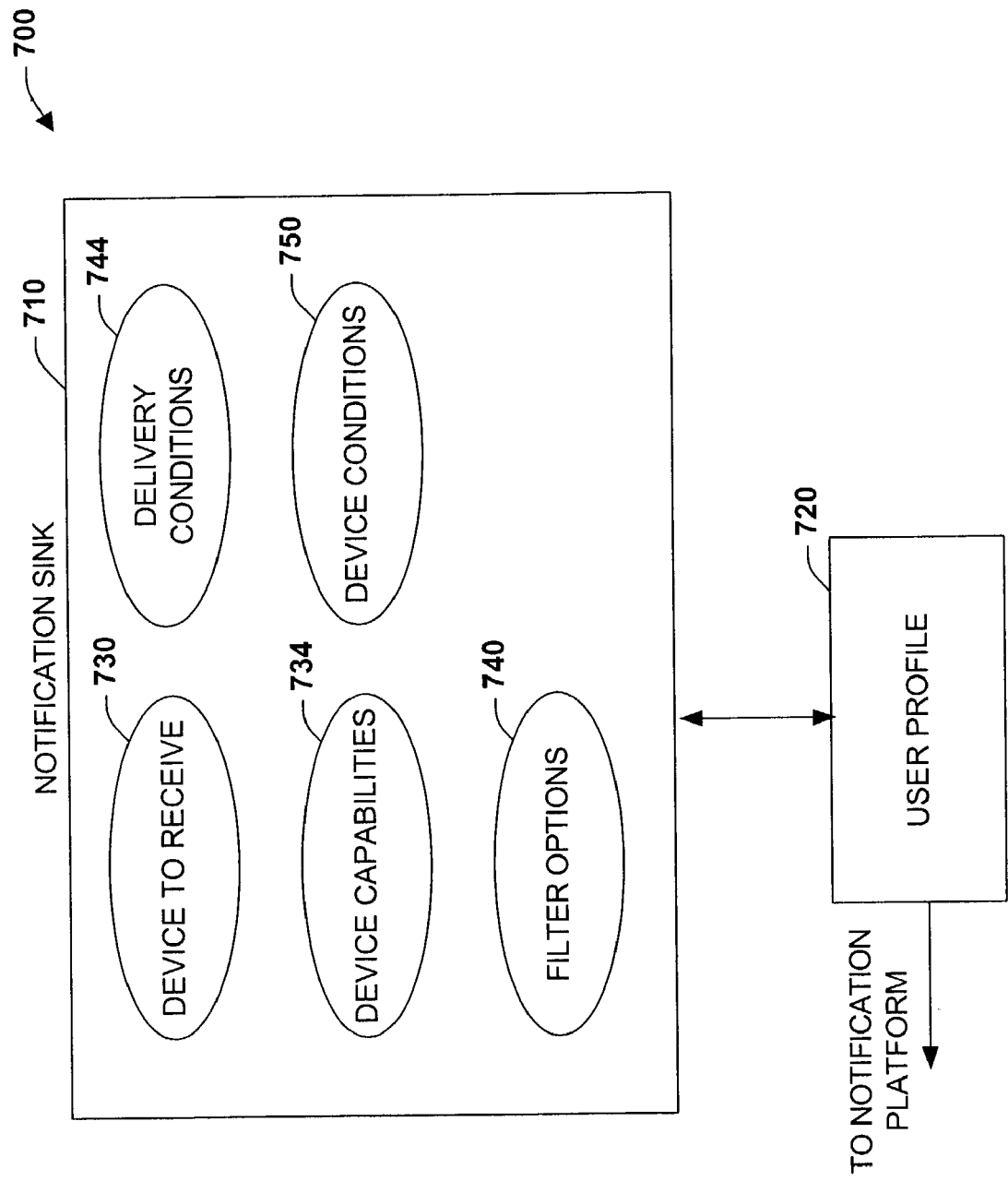
FIG. 7 is a diagram illustrating device configurations in accordance with an aspect of the present invention.

FIG. 7 illustrates device configurations 700 for receiving notifications in accordance with an aspect of the present invention. In this aspect, a notification sink configures one or more notification aspects that enable users to tune or adjust how notifications are delivered to the sink. As illustrated, these aspects can be stored in a user profile 720 that is read by a notification platform or broker when determining how to deliver notification to the sink 710. At 730, devices to receive notifications are specified. For example, a user may desire to have information alerts directed to a cell phone and a wireless laptop computer, whereas high-end graphical notifications should only be sent to a desktop computer. Alternatively, the user may specify that Service A and Service B should direct notifications to the desktop, whereas Service C should direct notifications to a home e-mail address. At 734, one or more device capabilities are specified. In this aspect, depending on the capabilities specified, the notification service may alter or adjust notification output or subscriptions based upon device capabilities (e.g., for cell phone display, activate message chunking rules).

At 740, one or more device filter options may be selected. This can include activating junk or SPAM filter options to mitigate reception of unwanted notifications. Other options include setting controls to only allow notifications to be received from subscribed notification services and/or from designated notification sources. Still yet other options include specification of one or more rules that may be employed to limit or mitigate notifications (e.g., If message is received from hobby notification service during working hours, discard notification or queue message until I get home). At 744, one or more delivery conditions can be specified (e.g., If I only have cell phone availability, then queue my subscribed notifications to my desktop, If I am at desktop during non-lunch hour, send notifications after work). At 750, one or more device conditions can be specified (e.g., only route emergency notices to cell phone, route personal notifications to laptop and desktop, if away from desk top, un-subscribe to business notifications).

Figure 8:
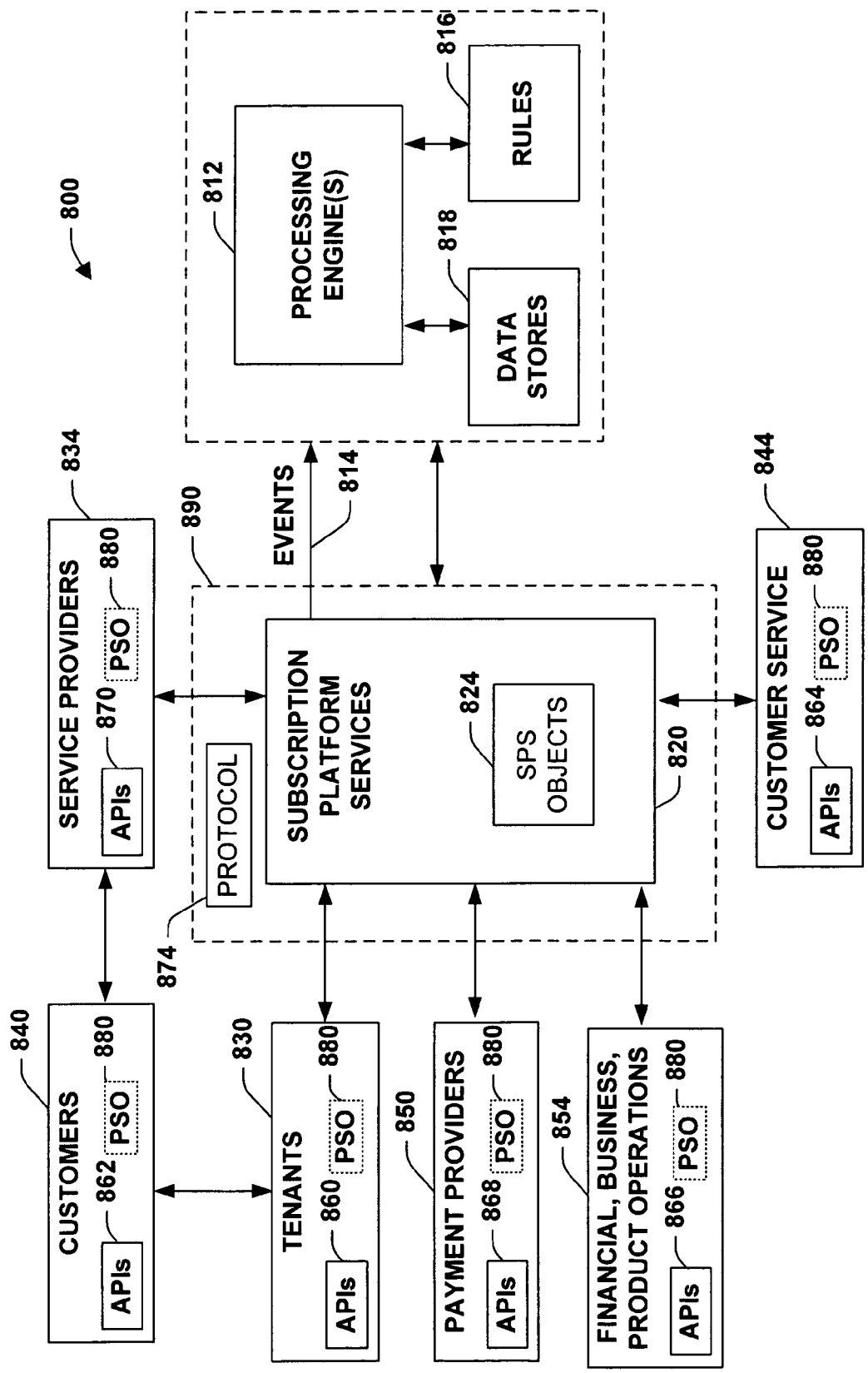
FIG. 8 illustrates a billing and provisioning processing architecture in accordance with an aspect of the present invention.
Figure 9:
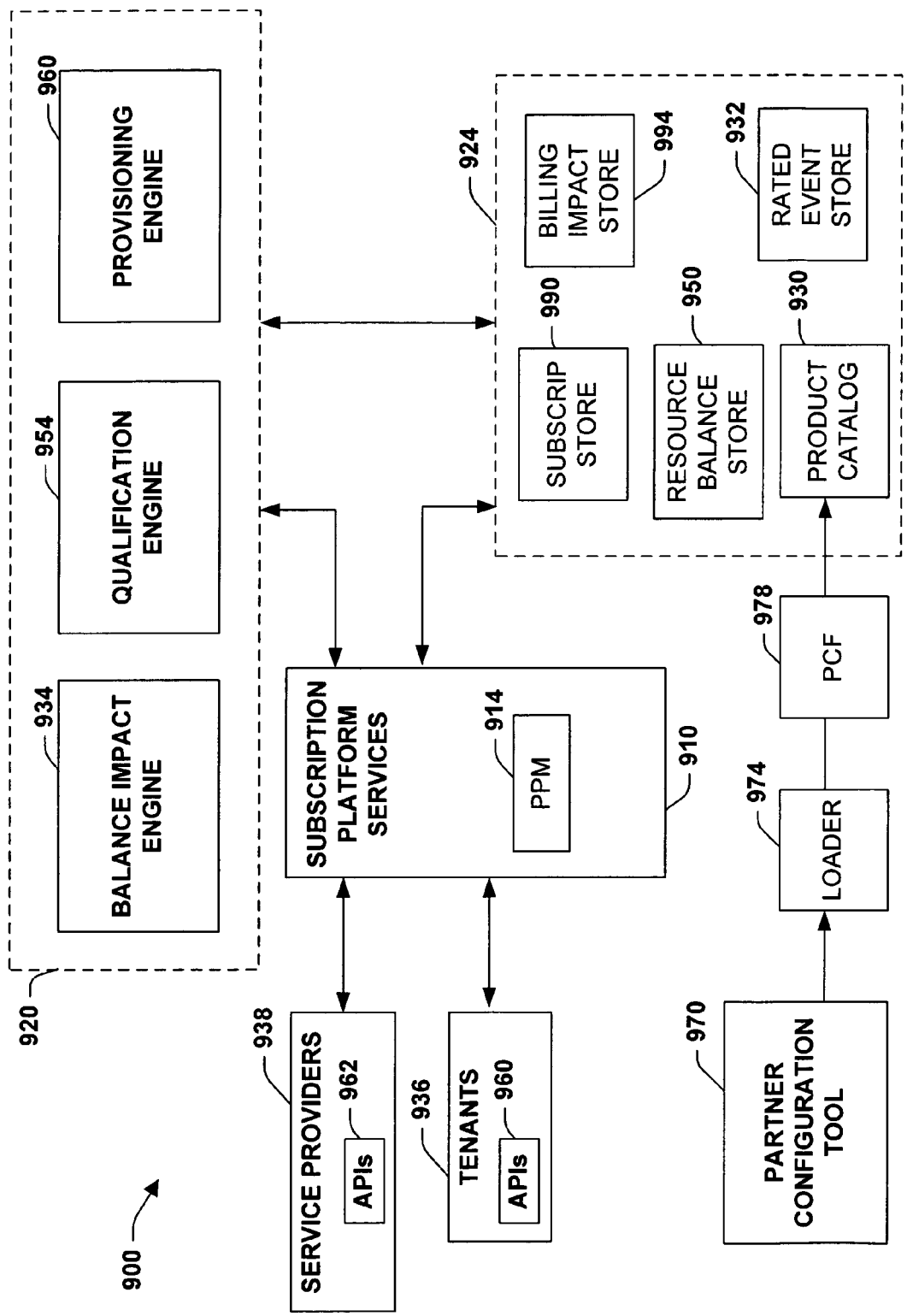
FIG. 9 illustrates an event processing architecture in accordance with the present invention.

FIGS. 8 and 9 illustrate automated billing and subscription services that may be employed with a notification platform and/or components associated therewith in accordance with the present invention. Referring to FIG. 8, a system 810 illustrates a billing and provisioning processing architecture in a distributed computing environment in accordance with an aspect of the present invention. The system 810 provides an infrastructure to support various billing relationships between parties and entities associated with a notification platform. One or more processing engines 812 are provided that respond to external billing and provisioning events 814 and operate according to a plurality of rules 816 that are associated with a respective processing engine 812. The events 814 can include internally determined events (not shown) within the processing engines 812 and generally conform to a subscription event model. The model represents state transitions that a subscription may pass through in a subscription lifecycle (e.g., subscription for online services such as e-mail). An example of such events 814 can include: Subscription Pre-Purchase, Subscription Purchase, Subscription Sponsorship, Subscription Cancel, Subscription Disable, Subscription Enable, Subscription Convert Out Of, Subscription Convert Into, Subscription Renewal, Subscription Usage Event Report, Subscription To Expire, User Service Profile Change, Subscription Expiration, Service Allocation, Service De-allocation, Service Suspension, and Service Enable. It is to be appreciated that other such events can be defined in accordance with the present invention.

The rules 816 can include service delivery rules, qualification rules, rating rules, and/or other type rules that facilitate billing and provisioning processing in accordance with the processing engines 812. Depending on the nature of the events 814, the processing engines 812 apply a set or subset of the rules 816 that are associated with the events. For example, service delivery rules define atomic units of service to be delivered that include data about the type of service, service level delivery, and/or associated resource balance relating to performance and payment of a service. Qualification rules define eligibility requirements for purchase of a respective service. These rules can be created to restrict and/or alter purchasing of services to a limited set of users, user languages, currencies, countries, tenants, service providers, existing services and/or offerings owned, affiliation with a particular tenant, payment via a particular method, and so forth. Rating rules facilitate determining balance impacts to currency balances that result in charges and/or include noncurrencies that monitor consumption and allocation of services. These rules can be defined within the scope of an individual offering to be processed in the context of the subscription event model, described above. As will be described in more detail below, one or more data stores 818 are provided to support billing and provisioning within the system 810 and related subscription/event processing by the processing engines 812.

A Subscription Platform Service (SPS) 820 is provided that includes one or more Subscription Platform Objects (SPO) 824 in order to establish and maintain billing, provisioning, and account relationships between one or more tenants 830, one or more service providers 834 and one or more customers 840. In general, the tenants 830 sell services that are performed by the service providers 834 to the customers 840, wherein the SPS 820 is employed to create and manage a respective billing account for such services. The tenant 830 offers a service or package of services (related or unrelated) to the customer 840 or consumer of the services. An offering can include an atomic unit of salable items associated with a service in the system 810. Offerings can contain collections of service delivery, qualification, and rating rules, plus multiple language and pricing descriptions for respective eligible languages, and include additional meta-data employed by the system 810. Subscriptions provide an instance of an offering that is associated with a respective end user or customer 840.

If a subscription for the service is desired, the tenant 830 retrieves credit card information or other type of billing arrangement from the customer 840, exchanges legal or contract information with the customer, and determines an amount to charge the customer on a regular or periodic basis for the service or services. The tenant 830 employs the SPS 820 to create a billing account, authorize the customer's credit card or other instrument with an associated financial institution, and notifies the service provider 834 to begin offering services to the customer 840. As services are performed by the service provider 834, the SPS 820 bills the customer's account. It is to be appreciated that other components illustrated in the system 810 can offer or sell services to the customer 840 in accordance with the present invention. For example, the service provider 834 can offer and sell services to the customer 840 without interacting with a respective tenant 830.

Other parties or entities that are involved with the SPS 820 include customer service components at 844 to provide on-going support and management of customer accounts. Payment providers at 850 (e.g., banks, financial institutions) facilitate payment of customer accounts, whereas financial, business, and product operations aspects are illustrated at 854. Financial and business operations can employ the SPS 820 for data manipulation and analysis, if desired, whereas product operations can utilize the SPS to determine and provide product catalog offerings such as with packaged services, for example.

In accordance with one aspect of the present invention, an Application Program Interface set (API) 860-870 is provided, wherein the respective entities 830-854 can interact with the SPS 820. The API set 860-870 generally performs as an interface to the SPS 820. It is through the API set 860-870 that tenants 830, service providers 834, customers 840, customer service representatives 844, payment providers 850 and/or financial/other operations 854 access one or more features of the subscription platform service 820. For example, the API set 860-870 can expose one or more of the following aspects such as Account Management, Product Catalog Search and Manipulation, Subscription Management, User Authorization, Usage events, Online Statements/Self-Care, Customer Service Utilities, Business and Product Operations, Utilities, Events and Notifications, and/or Provisioning Support.

An Extensible Markup Language (XML) schema can be provided that defines the platform objects 824 for provisioning, billing and/or customer care. For example, the objects 824 can include Accounts, Payment Instruments, Offerings, Service Components, Subscriptions, Service Instances, Role Assignments, Permits, Resources, Billing Statement Period Information, Billing Statement Payment Information, Billing Statement Line Items, Comments, and/or Settlement Information to name possible object functionality. The entities 830-854 can also interact with the SPS 820 and/or between entities across a network 890 and via a protocol 874.

The protocol 874 can include a Simple Object Access Protocol (SOAP), although as can be appreciated other protocols can be selected. SOAP facilitates a program running in one type of operating system to communicate with a program in the same or another kind of an operating system by utilizing Hypertext Transfer Protocol (HTTP) and/or XML as components for information exchange, as an example. An optional Partner Support Object (PSO) 880 can be provided with the entities 830-854 to facilitate communications between entities and the SPS 820. For example, the PSO 880 can provide a helper interface for establishing connections to the SPS 820 and/or provide connection pooling of objects to facilitate performance. The PSO 880 generally exposes a single API such as a connect interface. After installing the PSO 880, the respective entity 830-854 can utilize the PSO for authentication, authorization, and/or other communications, if desired.

It is noted, that the components described in the system 810, may run separately on different machines or computers, wherein respective a component by itself may run on multiple machines or computers—thus providing a multi-level component distribution in a distributed computing environment. In accordance with one aspect of the present invention, a routing mechanism or protocol can be provided to handle partitioning of subscription and billing information across several machines (e.g., partitions). This facilitates processing higher levels of traffic through the system 810, yet, maintain a level of fault tolerance in the system. For example, information can be partitioned via a combination of a hashing algorithm and a database (e.g., tower) to determine which partition a particular item of information may be located.

Referring now to FIG. 9, a system 900 illustrates an event processing architecture in accordance with the present invention. The system 900 can be organized into a multi-tier architecture that directs runtime communications with external parties through a Subscription Platform Services (SPS) layer 910. The SPS 910 includes a Partner Permissions Manager (PPM) 914 that facilitates enforcement of per partner permissions at tier associated with a partner communicating with the system 900. The PPM 914 is employed to enforce a partner permissions model on a per transaction basis enabling respective partners with suitable permissions to modify individual subscription and service states. The partner permissions model describes rights associated with a registered partner (e.g., tenants and/or service providers) that define their ability to modify individual subscription, account, and/or service states within the system 900.

The SPS 910 coordinates processing by various engines 920 within the system 900 and generally controls writing and updating data into various data stores 924. A product catalog 930 is provided that can include a defined SQL Server database that stores the catalog of service component definitions, partner permissions, and/or offering meta data. The product catalog 930 can also include rating, qualification, and/or service delivery rules associated with individual offerings. Additional features supported by the product catalog 930 include service component registrations (e.g., component ID assignments, partner IDs, URLs, support information), cross-partner offerings including multi-service component offerings and cross partner bundles. The catalog 930 can include globalized offerings according to a plurality of countries, languages, associated currencies, customs and taxes in addition to providing groups of offerings that map substantially any combination of services.

Offering information can also be stored in the product catalog 930. This information can include base, upgrade, downgrade, renewal, add-on, and mutual exclusivity between services information. In addition, eligibility information relating to date of sale, partners, languages, countries, currencies, maximum ownership per accounts, and valid payment instruments can be provided. Other offering information relates to billing cycles (e.g., monthly, multi-month, 28 day, forward/arrears cycle billing). This can also include information relating to renewals such as automatic or confirmed renewals and information relating to grace periods for settling accounts. Other catalog items can include event to rule mapping entries that define a subset of rules to be executed in the occurrence of an associated event.

A balance impact rating engine 934 processes an extensible set of rating rules and/or ratings events—from the product catalog 930 and a rated event store 932, respectively, in the context of a subscription and associated subscription events that can be stored in a subscription store 940. This engine 934 can process a plurality of balance impact events (e.g., events affecting payment and utilization of services) provided at the scale of multiple service providers, tenants, customers, and/or other entities. The balance impact events can be stored and processed in a billing impact store at 944. A resource balances store 950 maintains an aggregate amount for respective accounts that result from processing of rating rules by the balance impact rating engine 934. Balances can be "typed" to indicate a value for the units of service represented, and scoped to one or more service delivery rules. This can include processing currency and non-currency resources, and processing rating rules that respond to user driven events (UDE) such as purchase, cancellation, cycle, usage reports, convert to/from, renewal, suspend and reactivate, for example. In addition, ratable events can be partitioned according to periods and provide immediate settlements and/or settlement amounts aggregated per a selected payment instrument. It is noted that the engines 920 and/or system 900 components can be implemented in substantially any object model framework (e.g., COM, DCOM, CORBA, .NET).

A qualification engine 954 evaluates the eligibility of an individual user to purchase, cancel, and/or convert online service subscriptions. This engine 954 processes qualification rules (stored in the product catalog 930) associated with a given offering, employing attributes of an end user profile and associated subscriptions, for example. A provisioning engine 960 coordinates transactional processing of defined provisioning methods across common service providers in response to suitable events as provided in the subscription event model, described above. This engine 960 facilitates accurate and timely delivery of services to an end user. Provisioning methods include the act of setting the state (e.g., setting a flag or condition based on non-payment of bills) required to deliver or prevent delivery of a specified service to a designated user of the service or services. The provisioning engine 960 also controls the flow of communications to service providers 938, tenants 936, or other entity (not shown) that employ one or more APIs 960, 962 to respond to provisioning events.

A Partner Configuration Tool (PCT) 970 and a Partner Configuration Loader 974 can communicate to the product catalog 930 through an out-of-band process, if desired. Communications should be in accordance with an administrator having suitable security credentials for configuring and/or loading product catalog data. The PCT 970 can be implemented as a graphical user interface (GUI) tool to configure service delivery rules, offerings, qualification rules, and/or per tenant permissions in addition to other parameters. The Partner Configuration Loader 974 loads one or more Partner Configuration Files (PCF) 978 into multiple system environments facilitating shared development/testing—across partner's testing and deployment, into multiple production and pre-production environments. The Partner Configuration Loader 974 also facilitates creation of a partner account within the system 900 to provide a substantially secure transmission of protected data to a respective partner. A protecting key can be transmitted out of band, for example, in order to mitigate attempts at hacking the system 900. The PCF 978 can be a transient schema file that includes definitions of offerings and associated qualification, rating, service delivery rules and/or partner permissions in an XML format, if desired. This format can include design time attributes employed by the PCT 970 and/or runtime attributes employed by the various engines 920 in the system 900.

It is to be appreciated that the systems, components, and/or processes described thus far and described below can be implemented as individual components or processes and/or can be combined in various combinations. In addition, one or more of the described components and/or processes can be combined in accordance with various other components and/or processes—including providing all components and/or processes in a single component, or combinations of components, if desired.

Figure 10:
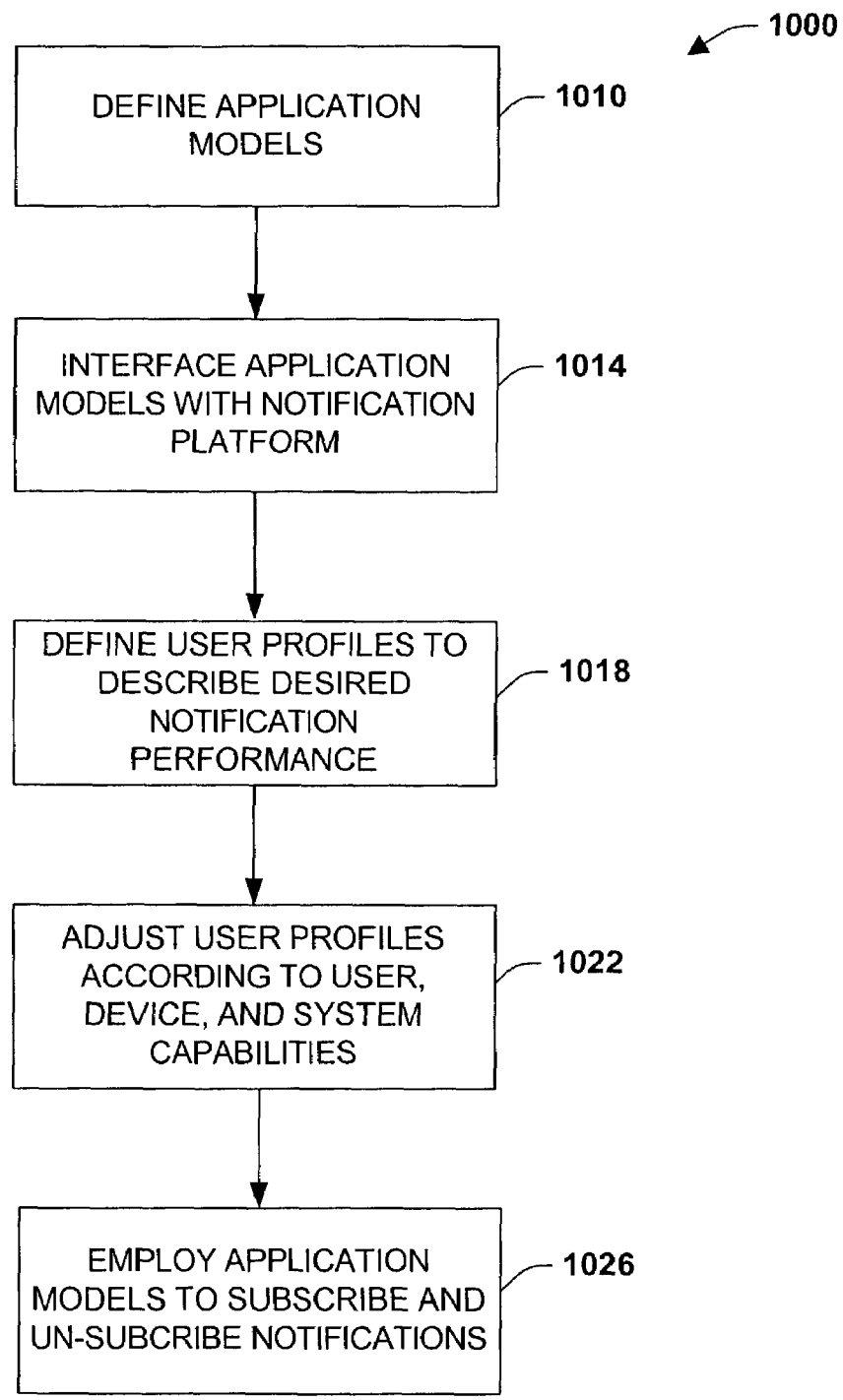
FIG. 10 is a flow diagram illustrating a notification delivery process in accordance with an aspect of the present invention.

FIG. 10 illustrates methodology for notification delivery processing in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 10 illustrates a notification delivery process 1000 in accordance with an aspect of the present invention. Proceeding to 1010, one or more application models are defined that can interact with a notification platform. As noted above, such models can include brokering models, pricing models, subscription access models, push/pull models, context models, and/or billing models. At 1014, the application models are interfaced with the notification platform. In other words, one or more of the application models are enabled in accordance with the operational framework of the notification platform to facilitate delivery of notifications to users and/or machines. At 1018, user profiles are defined that described desired notification performance. At 1022, the user profiles are adjusted according to user, device, and/or system capabilities. This can include providing interface and controls to facilitate adjustment of one or more of the application models, notification platform, components associated therewith, and/or system dynamics. At 1026, the application models are employed to subscribe and/or unsubscribe to notification services.

Figure 11:
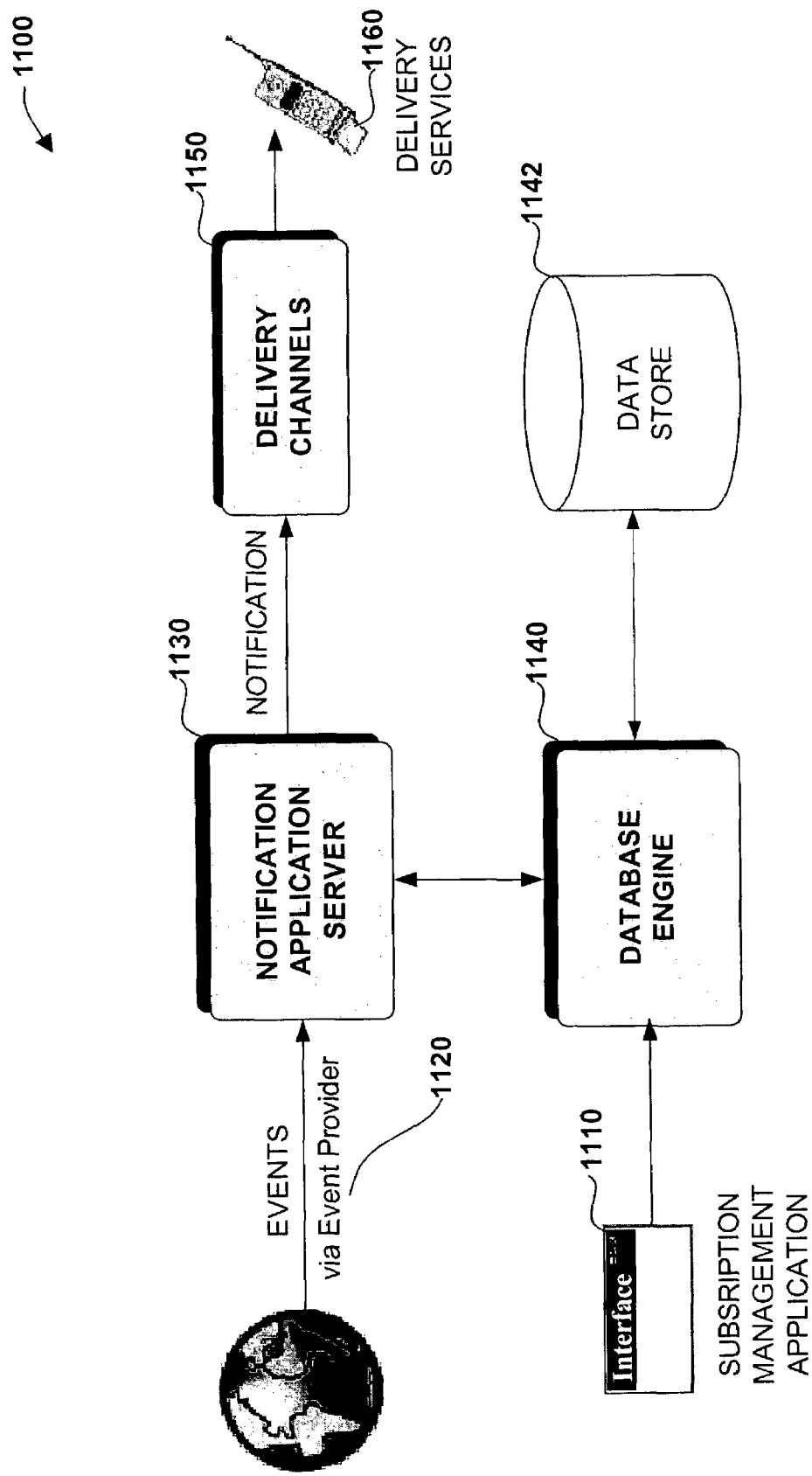
FIG. 11 is schematic block diagram of a notification application architecture in accordance with an aspect of the present invention.

Referring to FIG. 11, a system 1100 illustrates a notification application architecture in accordance with one aspect of the present invention. The notification system 1100 facilitates delivery of information to entities that have subscribed to an application. The system 1100 provides for high-scalability and affords for disseminating information to subscribers in a desired manner according to specific subscriber preferences. A subscriber is an entity (e.g., a person or application) that has subscribed to the notification system 1100. A subscription in accordance with the present invention can be an expressed interest in certain information (e.g., stock price or results of a sporting event), and the specification of a delivery mode (e.g., e-mail, voice mail, delivery via PDA, desktop computer, cellular telephone, television . . . ). Moreover, the present invention also provides for taking into consideration an individual's present state and associated delivery preferences according to present state. Thus, the notification system provides for dynamically modifying deliver modes given the type of information to be delivered, the criticality associated with the information, the subscriber's present state, and the deliver preferences given the aforementioned other parameters. One aspect of the invention that facilitates the system 1100 providing such highly scalable notification services is the employment of modeling subscriptions as data. Such subscription modeling mitigates the need to run queries individually per event per subscriber. Accordingly, numerous events can be concurrently processed with respect to a plurality of subscribers and relevant notifications provided to the respective subscribers in a meaningful manner in accordance with individual subscriber preferences.

Information that subscribers are interested in is collected as events. For example, a stock price at a specific time can be an event, as is a sports score, or a product delivery message—almost any suitable real world "happening" can be expressed as one or more events in accordance with the subject invention. A notification is a message delivered to a subscriber-specific device that contains information related to a subscription. A notification might contain a message about a new high value for a specific stock or the final score for a sporting event for example. The server notification services provide interfaces for gathering subscriptions and events, and then produces notifications based on this data.

Instead of treating individual subscriptions as queries, the notification system 1100 treats individual subscriptions as parameter data (e.g., an application developer can define a set of parameterized queries, each of which can be a subscription class)—evaluation of large numbers of subscriptions becomes a set-oriented data processing problem, for which database engines (e.g., SQL server) are well suited. This is a foundation of the notification system-programming framework of the present invention. In this model, event-triggered subscriptions are evaluated by simply executing a database join between events and a potentially large set of subscriptions. In general, the notion of modeling subscriptions as data is based on an assumption that if the notification system 1100 defines various domains, then many queries will have a common structure. For instance, many subscribers are interested in stock values, but at a finer granularity respective subscribers desire information about different stocks at different values. Thus, an interest in a particular stock can be expressed as "STOCKSYMBOL" and "TRIGGERPRICE" so as to provide a common framework or parameter(s) for such information. The semantics of how these parameter values are interpreted in relation to the event data can be are defined by the application. Thus, the application fixes the logic of how subscription parameters are interpreted (e.g., one app may want to alert when current price>trigger price and another may want to alert when current price<trigger price)—such semantics can be resolved in advance by the application developer, and designed such that a subscriber cannot introduce new semantics.

As discussed in greater detail below, the subject invention also encompasses a programming model for building subscription applications. In subscription applications a user establishes subscriptions or declarations of interest in certain kinds of targeted information. Thereafter, when the information becomes available, the subscription application sends a notification to the subscriber. A function of a subscription application is to match incoming data with the set of user subscriptions to determine what notifications need to be delivered. The subject programming model allows an application developer to write a small amount of application specific code (e.g. a mix of XML, SQL, C#, C++, VB and other languages suitable for support by the .NET framework) to build a fully-functional, rich subscription application. To enable such functionality, an execution engine can be built on top of SQL Server and the .NET frameworks, for example, that implements fundamental data constructs and execution semantics common to subscription applications. Thus, the subject programming model reduces development time, facilitates application maintenance and increases application efficiency by leveraging the power of a server, for instance SQL Server, to do subscription and event matching.

The subject invention includes a declarative programming model for building subscription applications. The programming model provides a base framework for the structure of applications; and a developer can adapt the base framework to build a specific application.

With respect to the high-level schematic illustration of the system 1100, five components of notification services cooperate to provide the functionality described above. A subscription management application 1110 provides an interface for subscribers to submit subscriptions as input to the system 1100. In particular, the subscription management application 1110 provides numerous application programmer interfaces (APIs) that facilitate entities to provide subscription services via the system 1100—the APIs are discussed in greater detail infra. Event data can also gathered from external sources via an event provider 1120. For example, an event provider in accordance with the present invention can gather or be pushed relevant events from a plurality of resources (e.g., newspapers, magazines, websites, libraries, individuals, employers, government(s), etc.). A database engine 1140 stores events and/or subscriptions in a data store 1142, and also runs statements, like Transact-SQL statements, and stored procedures. It is to be appreciated that the database engine 1140 can also process events versus subscriptions in real-time without persistently storing information. A notification application server 1130 processes subscriptions based on a set of events and ultimately generates notifications that are delivered to subscribers, and which can be stored in the database 1142 if desired. Finally, delivery channels 1150 route the generated notifications to delivery services 1160, which can include, but are not limited to, Exchange servers, SMS servers, and .NET Alert Web services.

Figure 12:
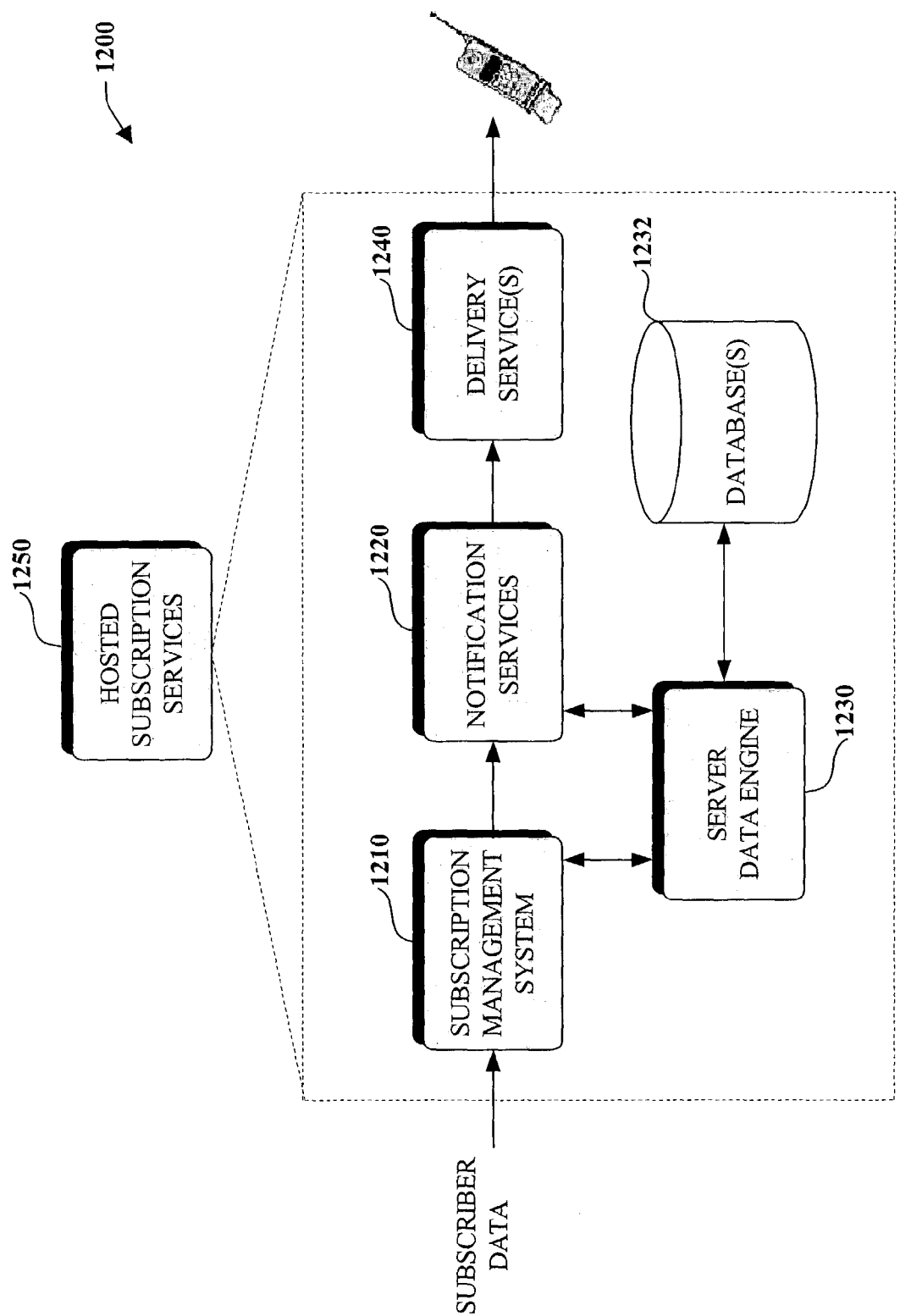
FIG. 12 is a schematic block diagram of a notification creation and distribution system in accordance with an aspect of the present invention.

FIG. 12 illustrates a notification creation and distribution system 1200 in accordance with an aspect of the present invention. The system 1200 includes a subscription management system (one or more subscription management applications) 1210, notification services 1220, a data engine 1230, database(s) 1232, delivery services 1240, and one or more subscription services 1250 hosted by the notification system 1200. The server database engine 1230 provides for processing and storing instance and application data. In particular, the server database engine 1230 stores and retrieves instance and application information from database(s) 1232. The data engine 1230 also provides other services employed by the notification services 1220. For example, the notification services 1220 can employ Transact-SQL language to join event and subscription data via the data engine 1230. Such integration provides scalable performance gains, because the data engine 1230 is likely to be highly optimized for joins as a result of the information processing capabilities afforded by SQL services. The subscription management system 1210, provides a hosting environment for user interfaces that collect subscriber and subscription data as well as accommodate a variety of unique subscription services 1250. The subscription management system can employ a Windows® application for submitting subscriber and subscription data, or can use an automated process for loading subscriber and subscription data from another system. The delivery services 1240 (e.g., .NET Alerts and Microsoft Exchange Server) receive notifications from the notification services 1220 and send the notifications to appropriate subscribers.

Functionally, events are submitted to the server data engine 1230 through a hosted event provider in notification services 1220, or through a non-hosted event provider outside of notification services. If employing a non-hosted event provider, another system may be used that supports the event provider, such as a Web server. In addition, it is appreciated that the notification services 1220 can be deployed on a single server or scaled across multiple servers.

Figure 13:
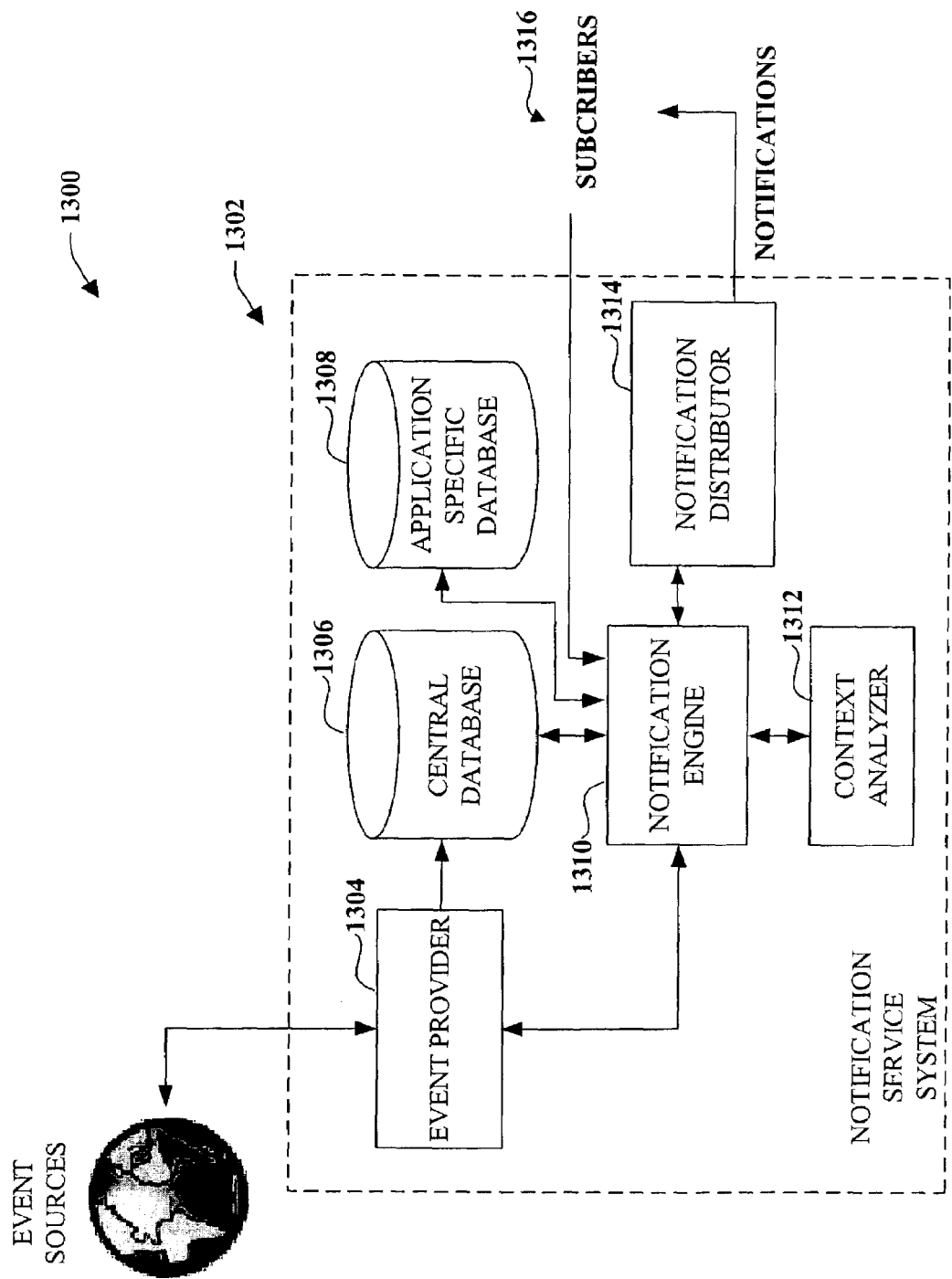
FIG. 13 is a schematic block diagram illustrating a notification service architecture in accordance with an aspect of the present invention.

Referring next to FIG. 13, a notification service architecture 1300 is illustrated in accordance with an aspect of the present invention. The architecture 1300 includes a notification services system 1302, which includes an event provider 1304, a central database 1306, an application-specific database 1308, notification engine 1310, context analyzer 1312, notification distributor 1314, and subscribers 1316. The notification services system 1302 receives input in the form of events and subscriber data, and supplies output or notification to subscribers 1316.

The event provider 1304 acquires events from event sources for the notification services system 1302. Events represent data changes in the external world. For example, a stock price at a specific time is an event, as is a sports score, or a product delivery message. Stated differently, events are items that are potentially interesting to some set of users, and such set of users define the particular input data via subscriptions. The event provider 1304 is employed to collect selected events from event sources for the notification services 1302. Moreover, the event provider 1304 can collect event data from a plurality of different sources including but not limited to communications, such as Internet and network-based communications, and telephony communications, as well as software services, XML files, applications, and databases.

Event sources are defined generally herein as that which generates events, which can also be referred to as notifications or alerts, intended to alert a user, or a proxy for the user, about information, services, and/or a system or world event. An event source can also be referred to as a notification source. Furthermore, the event provider 1304 can monitor and gather data through various methods. Exemplary methods of gathering data include but are not limited to, monitoring directories for file additions, checking system and application log files for certain types of entries, trapping alerts from applications, monitoring web pages, tracking changes in database tables, and reviewing data provided by web services. In most cases, an event provider can gather data from any suitable resource, provided that an application is prepared that retrieves events from the resource. In general, there are a variety of different models that can be employed by the event provider 1304 to collect data. These models can influence how often and under what circumstances the event provider 1304 will collect events from event sources.

In addition, the event provider 1304 can be notified or provided with data in at least one of two manners. The event provider 1304 may wait for information to be "pushed" or sent to it, or it can "pull" information from a source by polling the source and gathering any new or updated data. For example, if a user desires to be notified each time a headline story on a favorite news page changes, the event provider 1304 can be implemented so that it monitors that page and searches for changes to the headline text, for example. When the text changes, the event provider 1304 can extract the new headline data for the notification services system 1302. In the above example, the event provider 1304 is responsible for gathering needed data, because the data is not provided to the event provider from the event source as would be the case with employment of a push methodology.

Furthermore, the event provider 1304 can obtain new data for the notification system 1302 based on either a schedule or on the occurrence of an event that meets pre-defined criteria. A scheduled event provider can run periodically, based on settings implemented by an application developer. The scheduled event provider will start running, retrieve and submit new event data and then hibernate until a next scheduled trigger time. An event-driven event provider can monitor an event source by running continuously. Thereafter, when data that meets a particular criteria for collection is made available the event provider will collect and submit the event. Alternatively, an event-driven event provider may only run in response to a callback function or some other external stimulus. This external function would then determine whether there is valid event data to collect, and use the event provider as the means of collecting such data. Once the event provider 1304 collects data from an external event source, it writes the data to an event table in batches and saves the event table to database 1308.

Data is preferably handled in batches for the sake of efficiency—event data and notification data are both batched. A batch, as generally defined herein, can be a set of data processed as a group. For example, an event batch can be a set of events that are submitted to notification services 1302 at one time. Events can be written to the system either individually or as a group. When a single event is written to the system and there is not an event batch open, one can be created automatically. The new event and subsequent events are then associated with this automatically created batch. The event provider that is providing these events is programmed to close the current event batch periodically, which submits this batch of events for use in notification generation. A new event batch is then created with the first new event submission, and the cycle starts again. Furthermore, when events are written to the system as a group, each group is automatically assigned an event batch. When the writing process is completed, the event batch is closed so that these events are available for notification generation processes. In one particular embodiment of the invention, the batches are atomic (e.g., either the entire batch or none of it is submitted).

Figure 14:
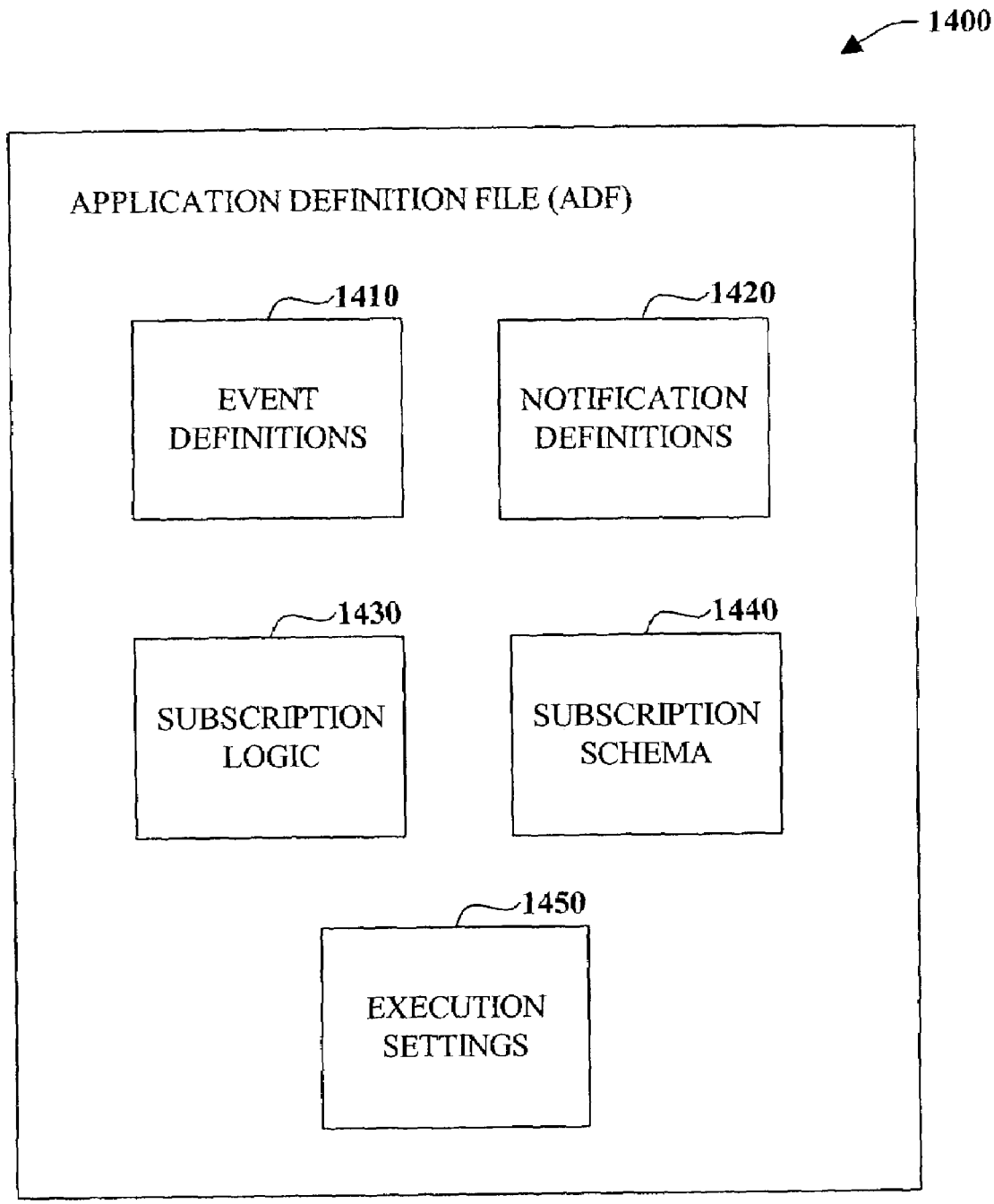
FIG. 14 is a block diagram depicting an ADF and its components in accordance with an aspect of the present invention.

Turning to FIG. 14, a block diagram depicting an ADF 1400 and its components is illustrated in accordance with an aspect of the present invention. The ADF 1400 defines central logic of the application and contains schemas for events, subscriptions, and notifications; the rules for matching events with subscriptions; and may provide the name of the file used to format generated notifications. The ADF 1400 generally includes five components: event definitions 1410, notification definitions 1420, subscription logic 1430, subscription schema 1440 and execution settings 1450. It is to be appreciated that the functionality of the various components can be combined into a lesser number of components or extrapolated into a larger set.

The event definitions 1410 specify structure of event data, the event providers that collect the data, and the structure of any event chronicles used by the application. The notification definitions 1420 specify the structure of raw notification data, the formatting for the messages that will be sent to subscribers, and the delivery protocols used to send the messages. The subscription logic 1430 defines how subscriptions are evaluated. Transact-SQL statements, for example, may match subscriptions to events, or evaluate subscriptions at certain recurring times. Additionally, subscription logic 1430 can be parameterized in a well-defined manner, so that individual subscriptions can personalize the subscription logic. Further, the subscription schema 1440 defines the structure of the subscription parameters, and evaluation times define when subscriptions are to be evaluated. Finally, the execution settings 1450 allow an application developer to enhance behavior and performance of the application when executed by notification services.

Additionally, the application developer may define application settings in several sections of the application definition file (ADF). These settings specify such items as the machines that host notification services, and execution schedules for notification services functions—they also document metadata about the ADF itself. This includes the structure of the events and subscriptions that the application accepts as input, and the structure of the notifications it produces. Examples of such metadata, described in detail below, include but are not limited to generator settings, distributor settings, vacuuming, version settings, notification history, application database information, application executing settings, and distributor information.

The notification services component 1220 (FIG. 12) includes a generator component (not shown) within the notification engine 1310 (FIG. 13) that matches events to subscriptions and ultimately produces notifications. Generator setting considerations may be defined in a <Generator> node in the ADF. One consideration that should be taken into account is how many threads the generator may use to process event batches. Such a factor can be considered a trade-off between improving application speed and monopolizing system resources. Part of such consideration is evaluating how much benefit can be gained by adding more threads. It is appreciated that some operations do not lend themselves to better efficiency through parallelism and may sometimes become less efficient. To indicate this information, a value can be specified for in a <ThreadPoolSize> element in the <Generator> node.

Functionally, the notification services generator attempts to execute event chronicle rules in parallel, followed by subscription rules (both event rules and scheduled rules). The generator will attempt to utilize threads available within the thread pool while executing rules. However, it should be noted that the generator should not execute event chronicle rules in parallel.

Figure 15:
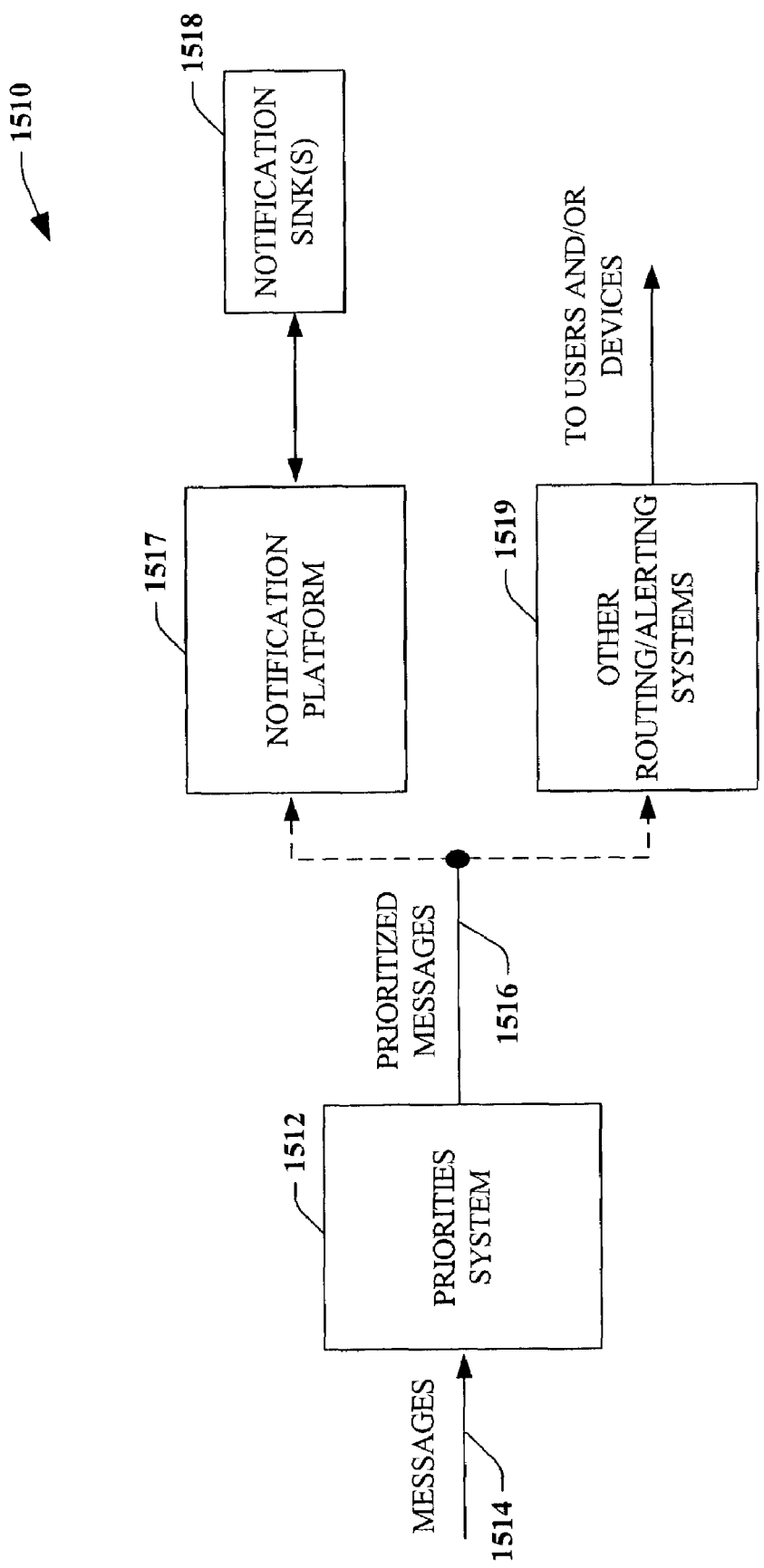
FIG. 15 is a schematic block diagram of a priorities system in accordance with an aspect of the present invention.

Referring to FIG. 15, a system 1510 illustrates a priorities system 1512 and notification architecture in accordance with an aspect of the present invention. The priorities system 1512 receives one or more messages or notifications 1514, generates a priority or measure of importance (e.g., probability value that the message is of a high or low importance) for the associated message, and provides the one or more messages with an associated priority value at an output 1516. As will be described in more detail below, classifiers can be constructed and trained to automatically assign measures of priorities to the messages 1514. For example, the output 1516 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 1517 can be employed in conjunction with the priorities system 1512 to direct prioritized messages to one or more notification sinks accessible to users. As will be described in more detail below, the notification platform 1517 can be adapted to receive the prioritized messages 1516 and make decisions regarding when, where, and how to notify the user, for example. As an example, the notification platform 1517 can determine a communications modality (e.g., current notification sink 1518 of the user such as a cell phone, or Personal Digital Assistant (PDA)) and likely location and/or likely focus of attention of the user. If a high importance e-mail were received, for example, the notification platform 1517 can determine the users location/focus and direct/reformat the message to the notification sink 1518 associated with the user. If a lower priority message 1516 were received, the notification platform 1517 can be configured to leave the e-mail in the user's in-box for later review as desired, for example. As will be described in more detail below, other routing and/or alerting systems 1519 may be utilized to direct prioritized messages 1516 to users and/or other systems.

Figure 16:
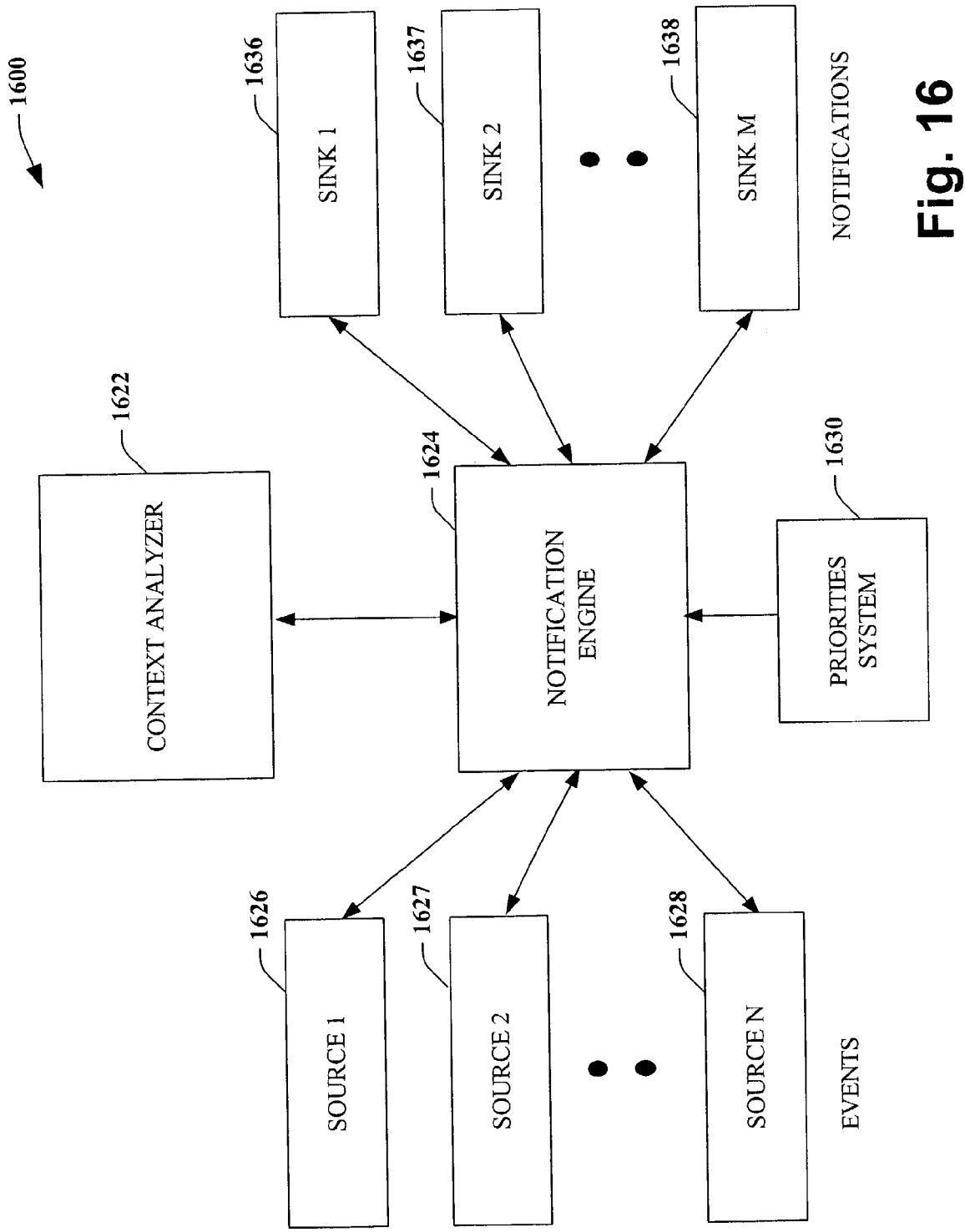
FIG. 16 is a schematic block diagram illustrating systematic cooperation between a notification engine and a context analyzer according to an aspect of the present invention.

Turning now to FIG. 16, a system 1600 illustrates how the notification engine and context analyzer function together according to an aspect of the present invention. The system 1600 includes a context analyzer 1622, a notification engine 1624, one or more notification sources 1 through N, 1626, 1627, 1628, a priorities system 1630, which can operate as a notification source, and one or more notification sinks, 1 through M, 1636, 1637, 1638, wherein N an M are integers, respectively. The sources are also referred to as event publishers, while the sinks are also referred to as event subscribers. There can be any number of sinks and sources. In general, the notification engine 1624 conveys notifications, which are also referred to as events or alerts, from the sources 1626-

1628 to the sinks 1636-1638, based in part on parametric information stored in and/or accessed by the context analyzer 1622.

The context analyzer 1622 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 1624, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 1622, according to one aspect of the present invention is inclusive of contextual information determined by the analyzer. The contextual information is determined by the analyzer 1622 by discerning the user's location and attentional status based on one or more contextual information sources (not shown), as is described in more detail in a later section of the description. The context analyzer 1622, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 1626-1628, 1630 generate notifications intended for the user and/or other entity. For example, the sources 1626-1628 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the priorities system 1630 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 1626-1628 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;
computer systems (e.g., that may alert the user with messages that information about alerts about system activity or problems);
Internet-related services, appointment information, scheduling queries;
changes in documents or numbers of certain kinds of documents in one or more shared folders;
availability of new documents in response to standing or persistent queries for information; and/or,
information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 1636-1638 are able to provide notifications to the user. For example, such notification sinks 1636-1638 can include computers, such as desktop and/or laptop computers, handheld computers, cell phones, landline phones, pagers, automotive-based computers, as well as other systems/applications as can be appreciated. It is noted that some of the sinks 1636-1638 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 1624 accesses the information stored and/or determined by the context analyzer, and determines which of the notifications received from the sources 1626-1628 to convey to which of the sinks 1636-1638. Furthermore, the notification engine 1624 can determine how the notification is to be conveyed, depending on which of the sinks 1636-1638 has been selected to send the information to. For example, it may be determined that notifications should be summarized before being provided to a selected sinks 1636-1638.

The invention is not limited to how the engine 1624 makes its decisions as to which of the notifications to convey to which of the notification sinks, and in what manner the notifications are conveyed. In accordance with one aspect, a decision-theoretic analysis can be utilized. For example, the notification engine 1624 can be adapted to infer important uncertainties about variables including a user's location, attention, device availability, and amount of time until the user will access the information if there were no alert. The notification engine 1624 can then make notification decisions about whether to alert a user to a notification, and if so, the nature of the summarization and the suitable device or devices to employ for relaying the notification. In general, the notification engine 1624 determines the net expected value of a notification. In doing so, it can consider the following:

- the fidelity and transmission reliability of each available notification sink;
- the attentional cost of disturbing the user;
- the novelty of the information to the user;
- the time until the user will review the information on his or her own;
- the potentially context-sensitive value of the information; and/or,
- the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 1624 can make decisions as to one or more of the following:

- what the user is currently attending to and doing (based on, for example, contextual information);
- where the user currently is;
- how important the information is;
- what is the cost of deferring the notification;
- how distracting would a notification be;
- what is the likelihood of getting through to the user; and,
- what is the fidelity loss associated with the use of a specific mode of a given notification sink.

Therefore, the notification engine 1624 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

Furthermore, the notification engine 1624 can access information stored in a user profile by the context analyzer 1622 in lieu of or to support a personalized decisiontheoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 1624 determines how and whether to notify the user.

According to one aspect of the present invention, the notification platform architecture 1600 can be configured as a layer that resides over an eventing or messaging infrastructure. However, the invention is not limited to any particular eventing infrastructure. Such eventing and messaging systems and protocols can include:

- HyperText Transport Protocol (HTTP), or HTTP extensions as known within the art;
- Simple Object Access Protocol (SOAP), as known within the art;
- Windows Management Instrumentation (WMI), as known within the art;
- Jini, as known within the art; and,
- substantially any type of communications protocols, such as those based on packet-switching protocols, for example.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks receive notifications, alerts and events, for example. The present invention is not so limited, however.

Figure 17:
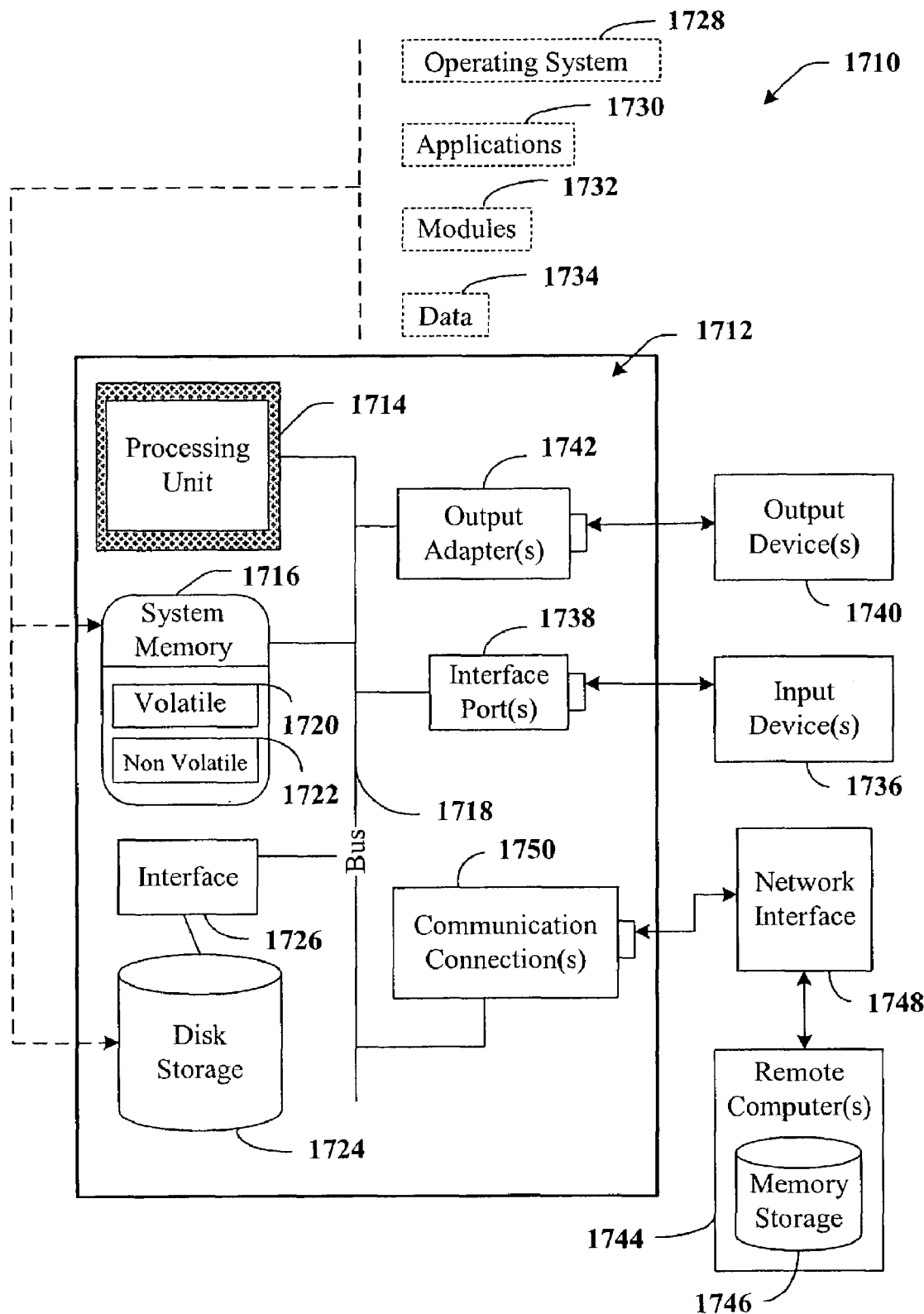
FIG. 17 is a schematic block diagram illustrating a suitable operating environment in accordance with an aspect of the present invention.

With reference to FIG. 17, an exemplary environment 1710 for implementing various aspects of the invention includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/non-volatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the present invention can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapter 1742 is provided to illustrate that there are some output devices 1740 like monitors, speakers, and printers, among other output devices 1740, that require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

Figure 18:
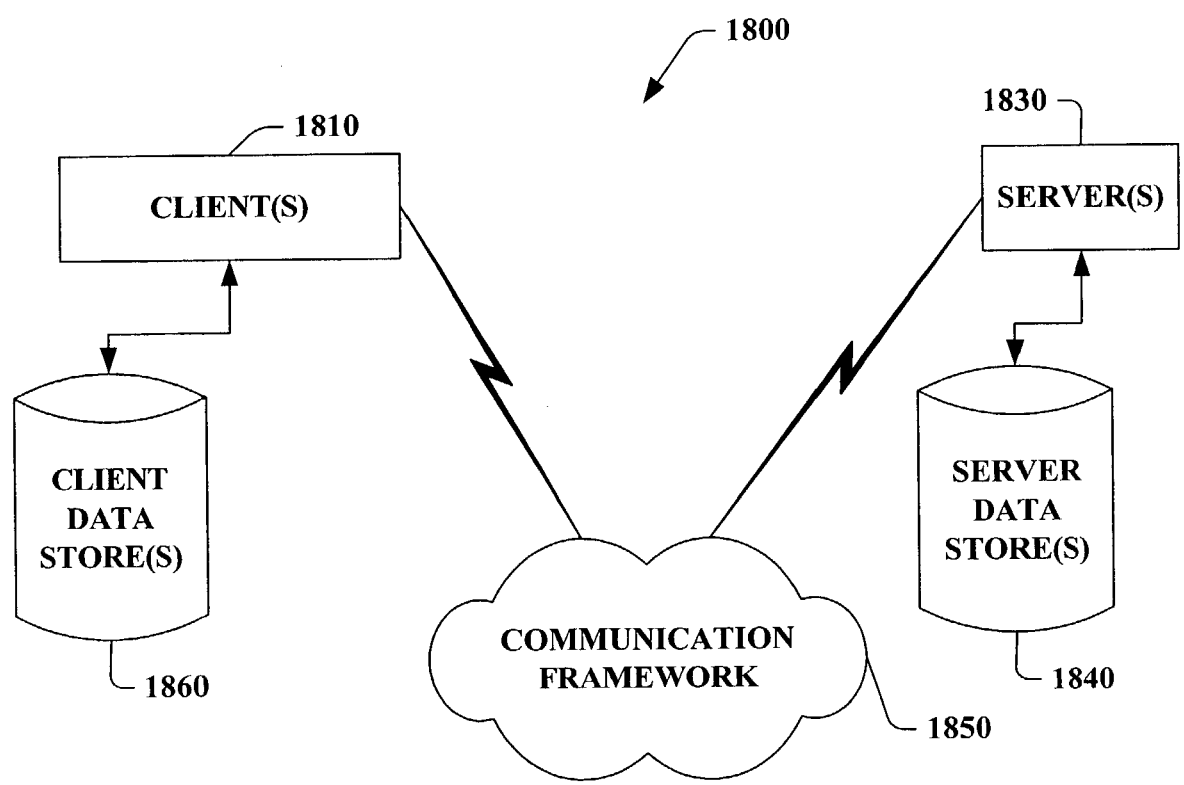
FIG. 18 is a schematic block diagram of a sample-computing environment with which the present invention can interact.

FIG. 18 is a schematic block diagram of a sample-computing environment 1800 with which the present invention can interact. The system 1800 includes one or more client(s) 1810. The client(s) 1810 can be hardware and/or software (e.g., threads, processes, computing devices). The system 1800 also includes one or more server(s) 1830. The server(s) 1830 can also be hardware and/or software (e.g., threads, processes, computing devices). The servers 1830 can house threads to perform transformations by employing the present invention, for example. One possible communication between a client 1810 and a server 1830 may be in the form of a data packet adapted to be transmitted between two or more computer processes. The system 1800 includes a communication framework 1850 that can be employed to facilitate communications between the client(s) 1810 and the server(s) 1830. The client(s) 1810 are operably connected to one or more client data store(s) 1860 that can be employed to store information local to the client(s) 1810. Similarly, the server(s) 1830 are operably connected to one or more server data store(s) 1840 that can be employed to store information local to the servers 1830.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer storage medium comprising the following components implementing a notification platform:
   a database engine component that processes received events and subscription information, the database engine component modeling the events and subscriptions as data prior to processing so as to facilitate event and subscription processing;
   a notification platform component that delivers notifications to one or more notification sinks associated with subscribers in accordance with the processed events and subscription information, and wherein the notification platform component comprises at least one SQL server that processes data from a plurality of event sources and performs join operations to distribute notifications to the at least one notification sink;
   a context analyzer component that analyzes information regarding variables and parameters of a user, wherein the notification platform component distributes notifications based on the variables and parameters stored by the context analyzer component, and wherein the parameters comprise contextual information discerned based on observations made autonomously via one or more sensors and statistical models, observations dynamically inferred via automated inference, a user's state specified in real-time and default notification preference parameters, wherein the notification platform component performs a decision-theoretic analysis for pending notifications to determine whether to convey the pending notifications and a manner of conveying the pending notifications, by accessing variables and parameters stored in the context analyzer that indicate user preference;

an application model component comprising at least a subscription component that facilitates subscribing and unsubscribing to at least one source generating the notifications based at least on the user contextual information within the context analyzer component; and a billing component that credits the user's account during periods in which the user's information in the context analyzer component does not permit reception of the generated notifications.

2. The medium of claim 1, the application model component includes at least one of a brokering model, a dynamic pricing model, a subscription access model, a push model, a pull model, or a device model.

3. The medium of claim 1, the application model component includes a brokering model, the brokering model receives notification specifications from users and determines notification services to satisfy the specifications.

4. The medium of claim 3, the brokering model includes at least one of a notification brokering component and a subscription brokering component.

5. The medium of claim 4, the brokering model generates at least one of a service bundle and a notification bundle that is employed by a notification platform component to deliver notifications to a user.

6. The medium of claim 3, the brokering model receives the notification specifications via at least one of a query or an unsolicited request.

7. The medium of claim 1, the application model component includes a dynamic pricing model, the dynamic pricing model includes at least one of a group component, a volume component, a time-based component, a location-based component, or an association based component to facilitate price adjustments within a notification architecture.

8. The medium of claim 7, the dynamic pricing model is associated with at least one of a user profile, an attribute associated with the user profile, and a performance component to determine the price adjustments.

9. The medium of claim 1, the application model component includes a subscription access model, the subscription access model includes at least one of a subscription switch, a short term control, an intermittent control, a trial subscription control, or a conversion control to facilitate subscription adjustments.

10. The medium of claim 1, the application model component includes a pull model, the pull model is associated with a user's request to receive notifications that are not in accordance with the user's current subscriptions.

11. The medium of claim 1, the application model component includes a push model, the push model is driven by incentives offered to a user.

12. The medium of claim 11, the push model further comprises controls to disable information from being pushed to the user.

13. The medium of claim 1, a context model component employed to adjust a subscription associated with at least one notification service.

14. The medium of claim 13, the context model component includes at least one of a context source, a context characterization component, a context consumer, a component to obtain context, a context propagation component, or a component to expose context.

15. The medium of claim 1, the application model component includes a device model, the device model includes at least one of a receive component, a capabilities component, a filter component, a delivery conditions component, and a device conditions component to facilitate interactions with a notification platform or at least one subscription.

16. The medium of claim 1, the application model component includes a billing model, the billing model includes at least one of a subscription platform service and a processing engine to facilitate automated billing in accordance with a notification platform.

17. The medium of claim 16, the billing model includes a processing engine, the processing engine includes at least one of a balance impact engine, a qualification engine, and a provision engine to manage accounts associated with at least one notification service.

18. The medium of claim 16, the billing model further comprising at least one of a subscription store, a resource balance store, a billing impact store, a product catalog, or a rated event store.

19. A notification system comprising:

means for storing subscriptions data:

means for generating notifications from events and the subscriptions data; and means for delivering notifications to subscribers in accordance with at least one application component;

means for analyzing information regarding variables and parameters of a user, wherein the means for delivering notifications distributes notifications based on the variables and parameters stored by the means for analyzing information, and wherein the parameters comprise contextual information discerned based on observations made autonomously via one or more sensors and statistical models, observations dynamically inferred via automated inference, a user's state specified in real-time and default notification preference parameters, wherein analyzing the information involves performing a decision-theoretic analysis for pending notifications to determine whether to convey the pending notifications and in what manner to convey the pending notifications, by accessing variables and parameters that indicate user preference; and means for subscribing and unsubscribing to at least one source generating the notifications based at least on the user information within the analyzing means; and means for billing that credits the user's account during periods in which the user's information in the analyzing means does not permit reception of the generated notifications.

20. The system of claim 19, the application component further comprises at least one of a broker component, a price component, a subscription control component, a push component, a pull component, a context component, a device configuration component, and a billing component.

21. A computer implemented notification method, comprising the following computer executable acts:

defining by a computer processor, at least one application model;

interfacing the application model with a notification platform, the notification platform comprises at least one SQL server stored on a computer readable storage medium that processes data from a plurality of event sources and performs join operations to distribute notifications to at least one notification sink;

analyzing by the computer processor, information regarding variables and parameters of a user via a context analyzer executed wherein the notification platform component distributes notifications based on the variables and parameters stored by the context analyzer, and wherein the parameters comprise contextual information discerned based on observations made autonomously via one or more sensors and statistical models, observations dynamically inferred via automated inference, a user's state specified in real-time and default notification preference parameters;

performing by the computer processor, a decision-theoretic analysis for pending notifications to determine whether to convey the pending notifications and in what manner to convey the pending notifications, by accessing variables and parameters stored in the context analyzer executed the variables and parameters indicate user preference;

subscribing and unsubscribing to at least one source generating the notifications based at least on the user information within the context analyzer executed by the computer processor; and crediting by the computer processor the user's account during periods in which the user's information in the context analyzer does not permit reception of the generated notifications.

22. The method of claim 21, further comprising defining a user profile that adjusts a performance of the notification platform.

23. The method of claim 22, further comprising adjusting the user profiles to at least one of a device and system capabilities.

24. The method of claim 21, further comprising receiving notification specifications via at least one of a query and an unsolicited request, and further comprising packaging notification services based upon the specifications.

25. The method of claim 21, the notification service offering a discount based on at least one of a group component, a volume component, a time-based component, a location-based component, a context-based component, a usage-based component, and an association based component.

26. The method of claim 21, further comprising adjusting a subscription based at least on one of a subscription switch, a short term control, an intermittent control, a trial subscription control, and a conversion control.

27. The method of claim 21, further comprising at least one of pushing information to a user based on incentive and pushing information to a user based upon a user control.

28. The method of claim 21, further comprising employing context to adjust a subscription.

29. The method of claim 21, further comprising associating the notification platform with an automated billing system.

30. A notification system comprising:

a computer storage medium having stored thereon a database engine component that processes received events and subscription information, the database engine component modeling the events and subscriptions as data prior to processing so as to facilitate event and subscription processing; and one or more computer processors executing the following components stored on the computer storage medium:

a notification platform component that delivers notifications to one or more notification sinks associated with subscribers in accordance with the processed events and subscription information, and wherein the notification platform component comprises at least one SQL server that processes data from a plurality of event sources and performs join operations to distribute notifications to the at least one notification sink;

a context analyzer component that analyzes information regarding variables and parameters of a user, wherein the notification platform component distributes notifications based on the variables and parameters stored by the context analyzer component, and wherein the parameters comprise contextual information discerned based on observations made autonomously via one or more sensors and statistical models, observations dynamically inferred via automated inference, a user's state specified in real-time and default notification preference parameters, wherein the notification platform component performs a decision-theoretic analysis for pending notifications to determine whether to convey the pending notifications and a manner of conveying the pending notifications, by accessing variables and parameters stored in the context analyzer that indicate user preference;

an application model component comprising at least a subscription component that facilitates subscribing and unsubscribing to at least one source generating the notifications based at least on the user contextual information within the context analyzer component; and a billing component that credits the user's account during periods in which the user's information in the context analyzer component does not permit reception of the generated notifications.

* * * * *

UNITED STATES PATENT AND TRADEMARK OFFICE
CERTIFICATE OF CORRECTION

| | | |
|---|---|---|
| PATENT NO. | : 7,698,276 B2 | Page 1 of 1 |
| APPLICATION NO. | : 10/376197 | |
| DATED | : April 13, 2010 | |
| INVENTOR(S) | : Praveen Seshadri et al. | |

It is certified that error appears in the above-identified patent and that said Letters Patent is hereby corrected as shown below:

In column 32, line 30, in Claim 19, delete "data:" and insert -- data; --, therefor.

Signed and Sealed this
Seventeenth Day of May, 2011

David J. Kappos
*Director of the United States Patent and Trademark Office*